United States Patent
Mihota

(10) Patent No.: US 8,259,849 B2
(45) Date of Patent: Sep. 4, 2012

(54) WIRELESS COMMUNICATION APPARATUS, WIRELESS COMMUNICATION METHOD, COMPUTER PROGRAM, AND WIRELESS COMMUNICATION SYSTEM

(75) Inventor: Norihito Mihota, Saitama (JP)

(73) Assignee: Sony Corporation, Tokyo (JP)

( * ) Notice: Subject to any disclaimer, the term of this patent is extended or adjusted under 35 U.S.C. 154(b) by 694 days.

(21) Appl. No.: 12/433,127

(22) Filed: Apr. 30, 2009

(65) Prior Publication Data

US 2009/0274229 A1    Nov. 5, 2009

(30) Foreign Application Priority Data

May 2, 2008    (JP) ................ P2008-120597

(51) Int. Cl.
*H04L 27/00* (2006.01)
(52) U.S. Cl. ............. 375/299; 375/347; 375/267
(58) Field of Classification Search .......... 375/260, 375/267, 299, 347
See application file for complete search history.

(56) References Cited

U.S. PATENT DOCUMENTS

| 7,346,115 B2 | 3/2008 | Howard et al. |
| 2005/0095996 A1 | 5/2005 | Takano |

FOREIGN PATENT DOCUMENTS

| JP | 2004-072566 | 3/2004 |
| JP | 2005-045351 | 2/2005 |
| JP | 2005-0142715 | 6/2005 |
| JP | 2005-160030 | 6/2005 |
| JP | 2007-194812 | 8/2007 |
| JP | 2007-215038 | 8/2007 |
| JP | 2007-534271 | 11/2007 |
| JP | 2007-318730 | 12/2007 |
| JP | 2009-272823 | 11/2009 |
| WO | WO 2008-050788 | 5/2008 |

*Primary Examiner* — Kevin Kim
(74) *Attorney, Agent, or Firm* — Finnegan, Henderson, Farabow, Garrett & Dunner, L.L.P.

(57) ABSTRACT

There is provided a wireless communication apparatus including: a matrix estimating unit that estimates a channel matrix of N rows and M columns (N and M are natural numbers); a selecting unit that selects S rows (S is a natural number, and S<min(M, N)) from the channel matrix estimated by the matrix estimating unit and generates a sub-channel matrix of S rows and M columns; and an arithmetic unit that calculates an antenna weighting coefficient matrix based on the sub-channel matrix generated by the selecting unit. The selecting unit selects the S rows that make the size of the sub-channel matrix to be the maximum from all matrices having S rows which are selected from the channel matrix.

19 Claims, 28 Drawing Sheets

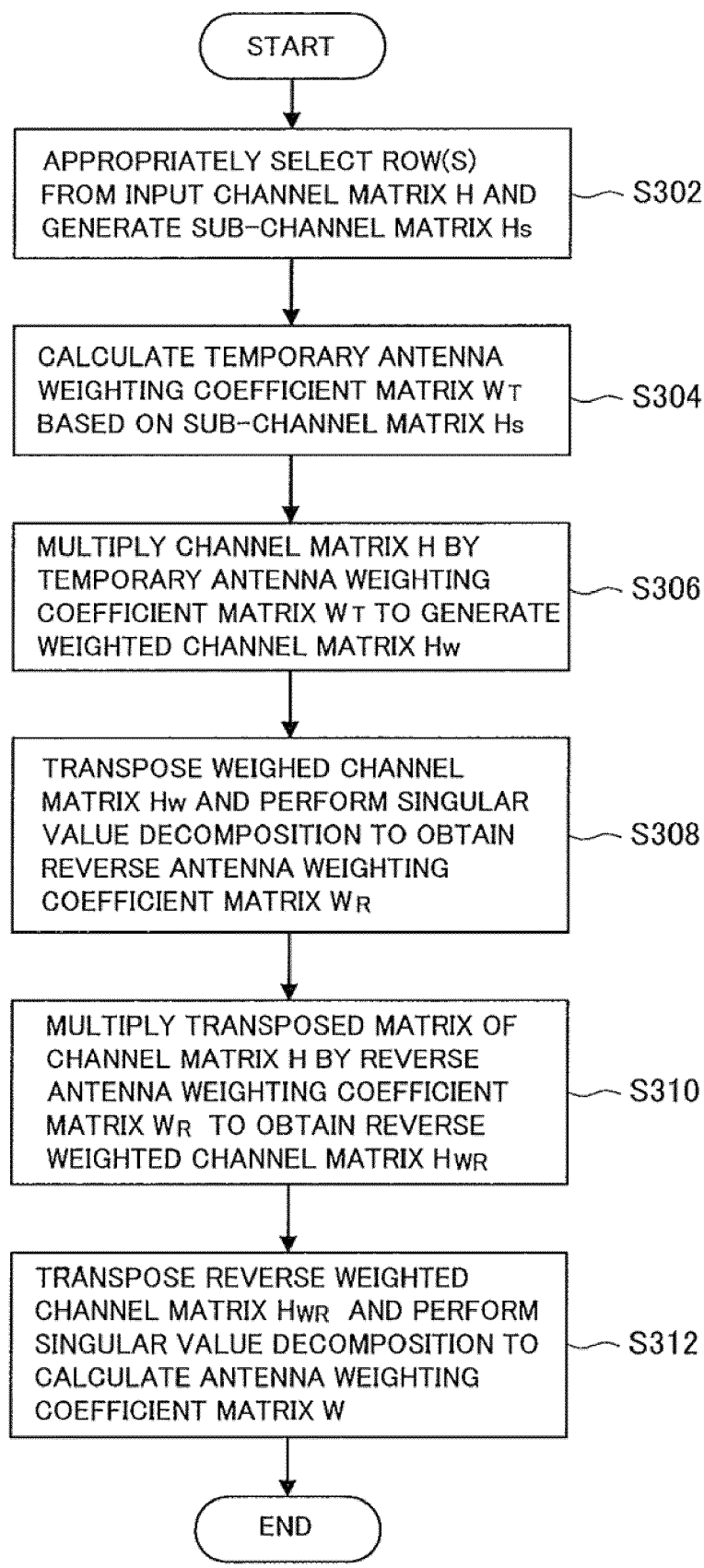

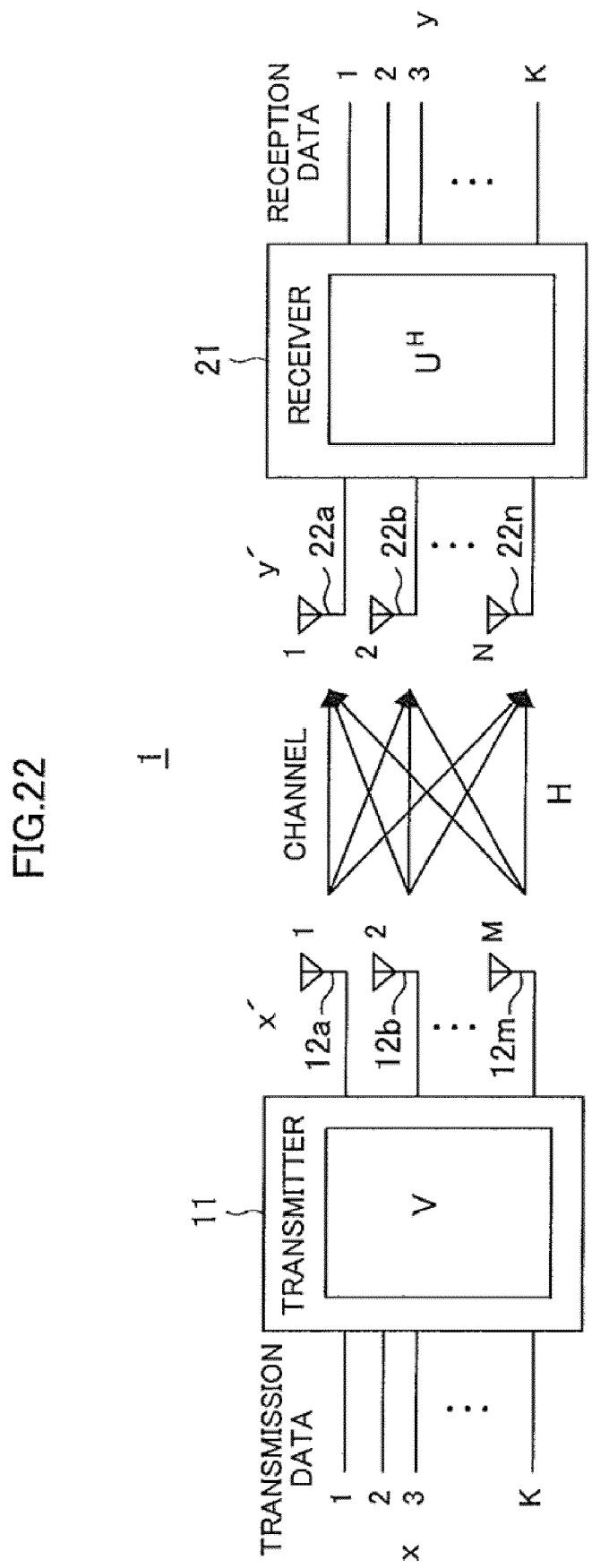

WIRELESS COMMUNICATION APPARATUS, WIRELESS COMMUNICATION METHOD, COMPUTER PROGRAM, AND WIRELESS COMMUNICATION SYSTEM

BACKGROUND OF THE INVENTION

1. Field of the Invention

The present invention relates to a wireless communication apparatus, a wireless communication method, a computer program, and a wireless communication system, and more particularly, to a wireless communication apparatus, a wireless communication method, a computer program, and a wireless communication system performing communication using a MIMO (multiple input multiple output) scheme.

2. Description of the Related Art

A wireless communication system has been proposed in which a transmitter and a receiver each have a plurality of antennas and space division multiplexing communication (MIMO scheme: multiple input multiple output) is performed using the plurality of antennas to increase transmission capacity.

FIG. 21 is a conceptual diagram illustrating a wireless communication system using the MIMO scheme. In a wireless communication system 1 shown in FIG. 21, a transmitter 11 includes M antennas 12a, 12b, ..., 12m, and a receiver 21 includes N antennas 22a, 22b, ..., 22n.

The transmitter 11 performs space/time division multiplexing on K transmission data, distributes the data to M antennas 12a, 12b, ..., 12m, and transmits the data through channels. Then, the receiver 21 receives the signals transmitted through the channels using N antennas 22a, 22b, ..., 22n, and performs space/time division demultiplexing on the received signals to obtain K reception data.

Therefore, the MIMO scheme is a communication system using channel characteristics in which the transmitter 11 distributes transmission data to a plurality of antennas and transmits it through the antennas, and the receiver 21 receives signals using a plurality of antennas and processes the signals to obtain reception data.

There are various data transmission systems using the MIMO scheme. As an ideal example of the data transmission system using the MIMO scheme, an eigenmode transmission system has been known which uses the singular value decomposition (SVD) or the eigenvalue decomposition of a channel matrix.

FIG. 22 is a conceptual diagram illustrating the eigenmode transmission system. In the eigenmode transmission system using SVD, singular value decomposition is performed on a channel matrix H having channel information between transmitting and receiving antennas as elements to calculate $UDV^H$ ($V^H$ indicates a complex conjugate transposed matrix of a matrix V). Singular value decomposition is performed on the channel matrix H to calculate $UDV^H$, the matrix V is given as a transmitter-side antenna weighting coefficient matrix, and a matrix $U^H$ ($U^H$ indicates a complex conjugate transposed matrix of a matrix U) is given as a receiver-side antenna weighting coefficient matrix. In this way, a channel can be represented by a diagonal matrix D having the square root (singular value) of an eigenvalue $\lambda_i$ of a covariance matrix ($H^H H$ or $HH^H$) of the channel matrix H. Therefore, it is possible to multiplex a signal and transmit the multiplexed signal, without any crosstalk.

When the number of antennas of the transmitter 11 is M, a transmission signal x' is represented by an M×1 vector. When the number of antennas of the receiver 21 is N, a received signal y' is represented by an N×1 vector. In addition, a channel matrix is represented as a matrix H of N rows and M columns. An element $h_{ij}$ of the channel matrix H is a transfer function from a j-th transmitting antenna to an i-th receiving antenna ($1 \leq i \leq N$ and $1 \leq j \leq M$). The received signal vector y' is obtained by adding a noise vector n to the multiplication of the channel matrix H and the transmission signal vector x', as represented by the following Expression 1.

$$y' = Hx' + n \qquad \text{(Expression 1)}$$

As described above, when singular value decomposition is performed on the channel matrix H, the following Expression 2 is obtained.

$$H = UDV^H \qquad \text{(Expression 2)}$$

The transmitter-side antenna weighting coefficient matrix V and the receiver-side antenna weighting coefficient matrix $U^H$ are unitary matrices that satisfy the following Expressions 3 and 4. In the following Expressions, I indicates a unitary matrix.

$$U^H U = I \qquad \text{(Expression 3)}$$

$$V^H V = I \qquad \text{(Expression 4)}$$

That is, the antenna weighting coefficient matrix $U^H$ of the receiver 21 is obtained by arranging the normalized eigenvectors of $HH^H$, and the antenna weighting coefficient matrix V of the transmitter 11 is obtained by arranging the normalized eigenvectors of $H^H H$. In addition, D indicates a diagonal matrix having the square root of (the singular value of H) of the eigenvalue of $H^H H$ or $HH^H$ as a diagonal component. That is, when the smaller one of the number M of transmitting antennas of the transmitter 11 and the number N of receiving antennas of the receiver 21 is referred to as L (=min(M, N)), the matrix D is a square matrix of L rows and L columns. That is, the matrix D can be represented by the following Expression 5.

$$D = \begin{pmatrix} \sqrt{\lambda_1} & 0 & \cdots & 0 \\ 0 & \sqrt{\lambda_2} & \cdots & 0 \\ \vdots & \vdots & \ddots & \vdots \\ 0 & 0 & \cdots & \sqrt{\lambda_L} \end{pmatrix} \qquad \text{(Expression 5)}$$

When the transmitter 11 multiplies data by the antenna weighting coefficient matrix V and transmits the data and the receiver 21 receives a signal and multiplies the signal by the complex conjugate transposed matrix $U^H$, the received signal y is represented by the following Expression 6 since the matrix U of N rows and L columns and the matrix V of M rows and L columns are unitary matrices.

$$\begin{aligned} y &= U^H y' \qquad \text{(Expression 6)} \\ &= U^H (Hx' + n) \\ &= U^H (HVx + n) \\ &= U^H (UDV^H) Vx + U^H n \\ &= (U^H U) D (V^H V) x + U^H n \\ &= IDIx + U^H n \\ &= Dx + U^H n \end{aligned}$$

In this case, each of the received signal y and the transmission signal x is a vector of L rows and one column. Since the matrix D is a diagonal matrix, each transmission signal transmitted from the transmitter 11 can be received by the receiver 21 without any crosstalk. Since the diagonal element of the matrix D is the square sum of the eigenvalue $\lambda_i$ ($1 \leq i \leq L$), the power of each reception signal is $\lambda_i$ times the power of each transmission signal. In addition, for the noise component n, since the column of U is an eigenvector having a norm that is normalized to 1, $U^H n$ does not change the noise power thereof. Therefore, UHn is a vector of L rows and one column, and the received signal y and the transmission signal x have the same size.

As such, in the eigenmode transmission system using the MIMO scheme, it is possible to obtain a plurality of independent logic pulses having the same frequency at the same time without any crosstalk. That is, it is possible to wirelessly transmit a plurality of data using the same frequency at the same time, thereby improving a transmission rate.

SUMMARY OF THE INVENTION

In the MIMO transmission, an antenna weighting method in the transmitter, particularly, a weighting method for eigenmode transmission can be represented by the above-mentioned Expressions. JP-A No. 2005-160030 also discloses a weighting method using expressions.

However, in order to perform eigenmode transmission, when the number of antennas in the transmitter is M and the number of antennas in the receiver is N, computation needs to be performed on a channel matrix of N rows and M columns. In this case, in order to obtain ideal characteristics even when the number S of data streams to be transmitted is smaller than the number of antennas, computation needs to be performed on the channel matrix of N rows and M columns. In this case, the number S of data streams means the number of pulses that are actually used among the independent pulses for the eigenmode transmission, and is equal to or smaller than L.

For example, when the number of transmitting antennas is 4, the number of receiving antennas is 4; and the number of data streams is 2, it is necessary to perform computation, such as SVD, on a channel matrix H of 4 rows and 4 columns in order to perform eigenmode transmission. When singular value decomposition is performed on the channel matrix H, $H=UDV^H$ is satisfied. In this case, each of the matrices U, D, and V is a unitary matrix of 4 rows and 4 columns. In the matrix V obtained by SVD, two columns are used as an antenna weighting coefficient matrix to transmit two data streams.

In general, an excessively large amount of computation is needed to calculate the antenna weighting coefficient matrix requires, as in SVD. As the size of an input channel matrix is increased or as the rank of a matrix is increased, the amount of computation is sharply increased. When the communication system is actually used, the amount of calculation depends on the size of a circuit or a computation time. Therefore, the amount of calculation needs to be small. However, as described above, particularly, even when the number of data streams is smaller than the number of antennas, the amount of calculation depends on the number of antennas, which is not preferable in terms of the mounting of the communication system.

The present invention has been made in views of the above issues, and it is desirable to provide a wireless communication apparatus, a wireless communication method, a computer program, and a wireless communication system capable of preventing an increase in the amount of computation when the maximum value of the number of data streams to be transmitted or received is smaller than the number of antennas used to transmit data.

According to an embodiment of the present invention, there is provided a wireless communication apparatus including: a matrix estimating unit that estimates a channel matrix of N rows and M columns (N and M are natural numbers); a selecting unit that selects S rows (S is a natural number, and S<min(M, N)) from the channel matrix estimated by the matrix estimating unit and generates a sub-channel matrix of S rows and M columns; and an arithmetic unit that calculates an antenna weighting coefficient matrix based on the sub-channel matrix generated by the selecting unit. The selecting unit selects the S rows that make the size of the sub-channel matrix to be the maximum from all matrices having S rows which are selected from the channel matrix.

The selecting unit may select the S rows that make the sum of the squares of elements of a matrix to be the maximum. The selecting unit may select the S rows that make an eigenvalue of a covariance matrix of a matrix or the maximum value of a singular value of the matrix to be the maximum.

The arithmetic unit may include: a coefficient calculating unit that calculates a temporary antenna weighting coefficient matrix based on the sub-channel matrix; a first matrix multiplying unit that multiplies the channel matrix by the temporary antenna weighting coefficient matrix to generate a weighted channel matrix; a singular value decomposing unit that performs singular value decomposition on the weighted channel matrix; and a second matrix multiplying unit that multiplies a right singular matrix obtained by the singular value decomposing unit by the temporary antenna weighting coefficient matrix to generate the antenna weighting coefficient matrix.

According to another embodiment of the present invention, there is provided a wireless communication apparatus including: a matrix estimating unit that estimates a channel matrix of N rows and M columns (N and M are natural numbers); a selecting unit that selects S rows (S is a natural number, and S<min(M, N)) from the channel matrix estimated by the matrix estimating unit and generates a sub-channel matrix of S rows and M columns; and an arithmetic unit that calculates an antenna weighting coefficient matrix based on the sub-channel matrix generated by the selecting unit. The selecting unit selects the S rows that make the reversibility of the sub-channel matrix to be the highest from all matrices having S rows which are selected from the channel matrix.

The selecting unit may select the S rows that make an eigenvalue of a covariance matrix of a matrix or the minimum value of a singular value of the matrix to be the maximum. The selecting unit may select the S rows that make a determinant of a covariance matrix of a matrix to be the maximum. The selecting unit may select the S rows that make a value obtained by dividing a determinant of a covariance matrix of a matrix by the sum of the squares of elements of the matrix to be the maximum.

The arithmetic unit may include: a coefficient calculating unit that calculates a temporary antenna weighting coefficient matrix based on the sub-channel matrix; a first matrix multiplying unit that multiplies the channel matrix by the temporary antenna weighting coefficient matrix to generate a weighted channel matrix; a singular value decomposing unit that performs singular value decomposition on the weighted channel matrix; and a second matrix multiplying unit that multiplies a right singular matrix obtained by the singular value decomposing unit by the temporary antenna weighting coefficient matrix to generate the antenna weighting coefficient matrix.

According to another embodiment of the present invention, there is provided a wireless communication apparatus including: a matrix estimating unit that estimates a channel matrix of N rows and M columns (N and M are natural numbers); a selecting unit that selects S rows (S is a natural number, and S<min(M, N)) from the channel matrix estimated by the matrix estimating unit and generates a sub-channel matrix of S rows and M columns; and an arithmetic unit that calculates an antenna weighting coefficient matrix based on the channel matrix estimated by the matrix estimating unit and the sub-channel matrix generated by the selecting unit. The arithmetic unit includes: a coefficient calculating unit that calculates a temporary antenna weighting coefficient matrix based on the sub-channel matrix; a first matrix multiplying unit that multiplies the channel matrix by the temporary antenna weighting coefficient matrix to generate a weighted channel matrix; a singular value decomposing unit that performs singular value decomposition on the weighted channel matrix; and a second matrix multiplying unit that multiplies a right singular matrix obtained by the singular value decomposing unit by the temporary antenna weighting coefficient matrix to generate the antenna weighting coefficient matrix.

According to another embodiment of the present invention, there is provided a wireless communication method including the steps of: estimating a channel matrix of N rows and M columns (N and M are natural numbers); selecting S rows (S is a natural number, and S<min(M, N)) from the estimated channel matrix and generating a sub-channel matrix of S rows and M columns; and calculating an antenna weighting coefficient matrix based on the selected sub-channel matrix. In the step of selecting the S rows, the S rows that make the size of the sub-channel matrix to be the maximum are selected from all matrices having S rows which are selected from the channel matrix.

According to another embodiment of the present invention, there is provided a wireless communication method including the steps of: estimating a channel matrix of N rows and M columns (N and M are natural numbers); selecting S rows (S is a natural number, and S<min(M, N)) from the estimated channel matrix and generating a sub-channel matrix of S rows and M columns; and calculating an antenna weighting coefficient matrix based on the generated sub-channel matrix. In the step of selecting the S rows, the S rows that make the reversibility of the sub-channel matrix to be the highest are selected from all matrices having S rows which are selected from the channel matrix.

According to another embodiment of the present invention, there is provided a wireless communication method including the steps of: estimating a channel matrix of N rows and M columns (N and M are natural numbers); selecting S rows (S is a natural number, and S<min(M, N)) from the estimated channel matrix and generating a sub-channel matrix of S rows and M columns; and calculating an antenna weighting coefficient matrix based on the estimated channel matrix and the generated sub-channel matrix. The calculating step includes the sub-steps of: calculating a temporary antenna weighting coefficient matrix based on the sub-channel matrix; multiplying the channel matrix by the temporary antenna weighting coefficient matrix to generate a weighted channel matrix; performing singular value decomposition on the weighted channel matrix; and multiplying a right singular matrix obtained by the singular value decomposition by the temporary antenna weighting coefficient matrix to generate the antenna weighting coefficient matrix.

According to another embodiment of the present invention, there is provided a computer program for allowing a computer to execute the steps of: estimating a channel matrix of N rows and M columns (N and M are natural numbers); selecting S rows (S is a natural number, and S<min(M, N)) from the estimated channel matrix and generating a sub-channel matrix of S rows and M columns; and calculating an antenna weighting coefficient matrix based on the generated sub-channel matrix. In the step of selecting the S rows, the S rows that make the size of the sub-channel matrix to be the maximum are selected from all matrices having S rows which are selected from the channel matrix.

According to another embodiment of the present invention, there is provided a computer program for allowing a computer to execute the steps of: estimating a channel matrix of N rows and M columns (N and M are natural numbers); selecting S rows (S is a natural number, and S<min(M, N)) from the estimated channel matrix and generating a sub-channel matrix of S rows and M columns; and calculating an antenna weighting coefficient matrix based on the generated sub-channel matrix. In the step of selecting the S rows, the S rows that make the reversibility of the sub-channel matrix to be the highest are selected from all matrices having S rows which are selected from the channel matrix.

According to another embodiment of the present invention, there is provided a computer program for allowing a computer to execute the steps of: estimating a channel matrix of N rows and M columns (N and M are natural numbers); selecting S rows (S is a natural number, and S<min(M, N)) from the estimated channel matrix and generating a sub-channel matrix of S rows and M columns; and calculating an antenna weighting coefficient matrix based on the estimated channel matrix and the generated sub-channel matrix. The calculating step includes the sub-steps of: calculating a temporary antenna weighting coefficient matrix based on the sub-channel matrix; multiplying the channel matrix by the temporary antenna weighting coefficient matrix to generate a weighted channel matrix; performing singular value decomposition on the weighted channel matrix; and multiplying a right singular matrix obtained by the singular value decomposition by the temporary antenna weighting coefficient matrix to generate the antenna weighting coefficient matrix.

According to another embodiment of the present invention, there is provided a wireless communication system including: a first wireless communication apparatus; and a second wireless communication apparatus. The first wireless communication apparatus includes a signal transmitting unit that transmits reference signals to the second wireless communication apparatus through a plurality of antennas. The second wireless communication apparatus includes: a matrix estimating unit that estimates a channel matrix of N rows and M columns (N and M are natural numbers) based on the reference signals received through a plurality of antennas; a selecting unit that selects S rows (S is a natural number, and S<min(M, N)) from the channel matrix estimated by the matrix estimating unit and generates a sub-channel matrix of S rows and M columns; and an arithmetic unit that calculates an antenna weighting coefficient matrix based on the sub-channel matrix generated by the selecting unit. The selecting unit selects the S rows that make the size of the sub-channel matrix to be the maximum from all matrices having S rows which are selected from the channel matrix.

According to another embodiment of the present invention, there is provided a wireless communication system including: a first wireless communication apparatus; and a second wireless communication apparatus. The first wireless communication apparatus includes a signal transmitting unit that transmits reference signals to the second wireless communication apparatus through a plurality of antennas. The second wireless communication apparatus includes: a matrix estimating unit that estimates a channel matrix of N rows and M columns (N and M are natural numbers) based on the reference signals received through a plurality of antennas; a selecting unit that selects S rows (S is a natural number, and S<min (M, N)) from the channel matrix estimated by the matrix estimating unit and generates a sub-channel matrix of S rows and M columns; and an arithmetic unit that calculates an antenna weighting coefficient matrix based on the sub-channel matrix generated by the selecting unit. The selecting unit selects the S rows that make the reversibility of the sub-channel matrix to be the highest from all matrices having S rows which are selected from the channel matrix.

According to another embodiment of the present invention, there is provided a wireless communication system including: a first wireless communication apparatus; and a second wireless communication apparatus. The first wireless communication apparatus includes a signal transmitting unit that transmits reference signals to the second wireless communication apparatus through a plurality of antennas. The second wireless communication apparatus includes: a matrix estimating unit that estimates a channel matrix of N rows and M columns (N and M are natural numbers) based on the reference signals received through a plurality of antennas; a selecting unit that selects S rows (S is a natural number, and S<min (M, N)) from the channel matrix estimated by the matrix estimating unit and generates a sub-channel matrix of S rows and M columns; and an arithmetic unit that calculates an antenna weighting coefficient matrix based on the channel matrix estimated by the matrix estimating unit and the sub-channel matrix generated by the selecting unit. The arithmetic unit includes: a coefficient calculating unit that calculates a temporary antenna weighting coefficient matrix based on the sub-channel matrix; a first matrix multiplying unit that multiplies the channel matrix by the temporary antenna weighting coefficient matrix to generate a weighted channel matrix; a singular value decomposing unit that performs singular value decomposition on the weighted channel matrix; and a second matrix multiplying unit that multiplies a right singular matrix obtained by the singular value decomposing unit by the temporary antenna weighting coefficient matrix to generate the antenna weighting coefficient matrix.

As described above, according to the above-mentioned embodiments of the present invention, it is possible to provide a wireless communication apparatus, a wireless communication method, a computer program, and a wireless communication system capable of preventing an increase in the amount of computation when the maximum value of the number of data streams to be transmitted or received is smaller than the number of antennas used to transmit data.

BRIEF DESCRIPTION OF THE DRAWINGS

FIG. 12 is a flowchart illustrating a method of calculating an antenna weighting coefficient matrix W according to the third embodiment of the present invention;

FIG. 22 is a conceptual diagram illustrating eigenmode transmission.

DETAILED DESCRIPTION OF THE PREFERRED EMBODIMENTS

Figure 1:
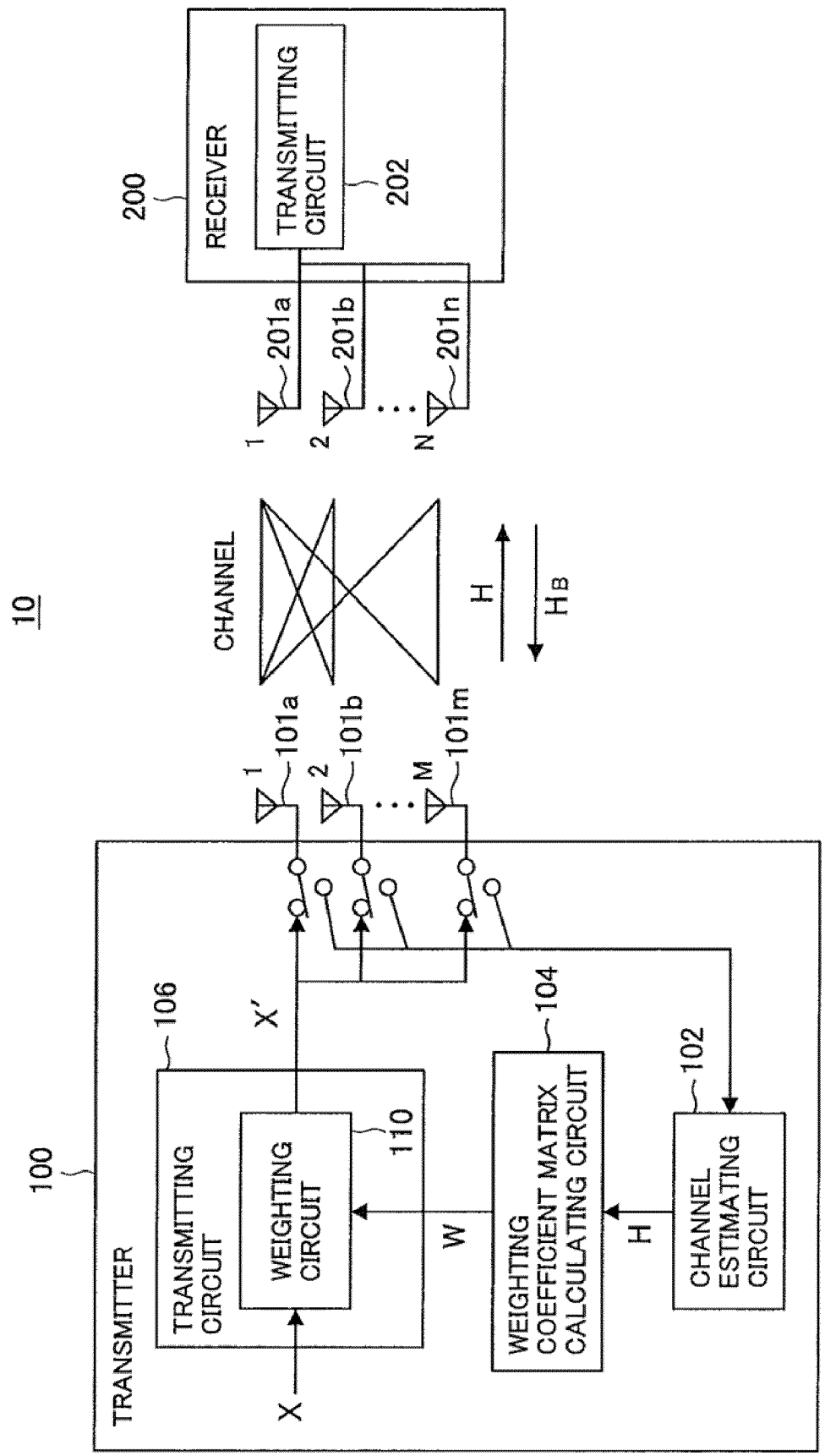
FIG. 1 is a diagram illustrating a wireless communication system 10 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(First Embodiment)

First, a wireless communication apparatus and a wireless communication system using the wireless communication apparatus according to a first embodiment of the present invention will be described.

FIG. 1 is a diagram illustrating a wireless communication system 10 according to the first embodiment of the present invention. Hereinafter, the wireless communication system 10 according to the first embodiment of the present invention will be described with reference to FIG. 1.

As shown in FIG. 1, the wireless communication system 10 according to the first embodiment of the present invention includes a transmitter 100 and a receiver 200.

Each of the transmitter 100 and the receiver 200 is an example of the wireless communication apparatus according to the present invention. The transmitter 100 transmits data to the receiver 200 using a plurality of antennas by a MIMO scheme, and the receiver 200 receives data transmitted from the transmitter 100 using a plurality of antennas by the MIMO scheme.

A data link from the transmitter 100 to the receiver 200 is defined as a forward link, and a link from the receiver 200 to the transmitter 100 is defined as a backward link. A channel matrix H of the forward link is a matrix of N rows and M columns, and a channel matrix $H_B$ of the backward link is a matrix of M rows and N columns. In addition, ideally, the channel matrix satisfies the following relationship represented by Expression 7.

$$H_B = H^T \qquad \text{(Expression 7)}$$

The transmitter 100 includes M antennas 101a, 101b, ..., 101m, a channel estimating circuit 102, a weighting coefficient matrix calculating circuit 104, and a transmitting circuit 106. The transmitting circuit 106 includes a weighting circuit 110.

The channel estimating circuit 102 estimates a channel matrix $H_B$ from the receiver 200 to the transmitter 100 using a known pattern (for example, a reference signal) transmitted from the receiver 200. A known method can be used to estimate the channel matrix, and thus a detailed description thereof will be omitted. Ideally, $H_B = H^T$ is satisfied by Expression 7. Therefore, it is possible to estimate a channel matrix H using the channel estimating circuit 102. The channel matrix H estimated by the channel estimating circuit 102 is input to the weighting coefficient matrix calculating circuit 104.

The weighting coefficient matrix calculating circuit 104 uses the channel matrix H transmitted from the channel estimating circuit 102 to calculate an antenna weighting coefficient matrix W for a transmission beam-forming. The antenna weighting coefficient matrix W generated by the weighting coefficient matrix calculating circuit 104 is input to the weighting circuit 110.

The transmitting circuit 106 receives a transmission data stream transmitted from the transmitter 100 to the receiver 200, and generates transmission signals to be transmitted from the antennas 101a, 101b, ..., 101m. The weighting circuit 110 multiplies a transmission data stream x transmitted from the transmitter 100 to the receiver 200 by the antenna weighting coefficient matrix W generated by the weighting coefficient matrix calculating circuit 104 to generate a transmission signal x'. The transmission signal x' generated by the weighting circuit 110 is radiated from each of the antennas, thereby performing transmission beam forming.

The channel estimating circuit 102 may be provided in the receiver 200. When the channel estimating circuit 102 is provided in the receiver 200, it receives a known pattern transmitted from the transmitter 100, and estimates the channel matrix H based on the received pattern. The receiver 200 notifies the channel matrix H to the transmitter 100 using any method (for example, a method of transmitting data related to the channel matrix H from the receiver 200 to the transmitter 100).

The weighting coefficient matrix calculating circuit 104 may also be provided in the receiver 200. When the weighting coefficient matrix calculating circuit 104 is provided in the receiver 200, it calculates the antenna weighting coefficient matrix W based on the channel matrix H. Then, the receiver 200 notifies the antenna weighting coefficient matrix W to the transmitter 100 using any method (for example, a method of transmitting data related to the antenna weighting coefficient matrix W from the receiver 200 to the transmitter 100).

The transmitting circuit 202 generates transmission signals to be transmitted from the receiver 200 to the transmitter 100 through the antennas 201a, 201b, ..., 201n. The transmitting circuit 202 transmits a known pattern (for example, a reference signal) used for the channel estimating circuit 102 to estimate the channel matrix H to the transmitter 100 through the antennas 201a, 201b, ..., 201n.

The wireless communication system 10 according to the first embodiment of the present invention has been described above with reference to FIG. 1. Next, the structure of the weighting coefficient matrix calculating circuit 104 according to the first embodiment of the present invention will be described.

Figure 2:
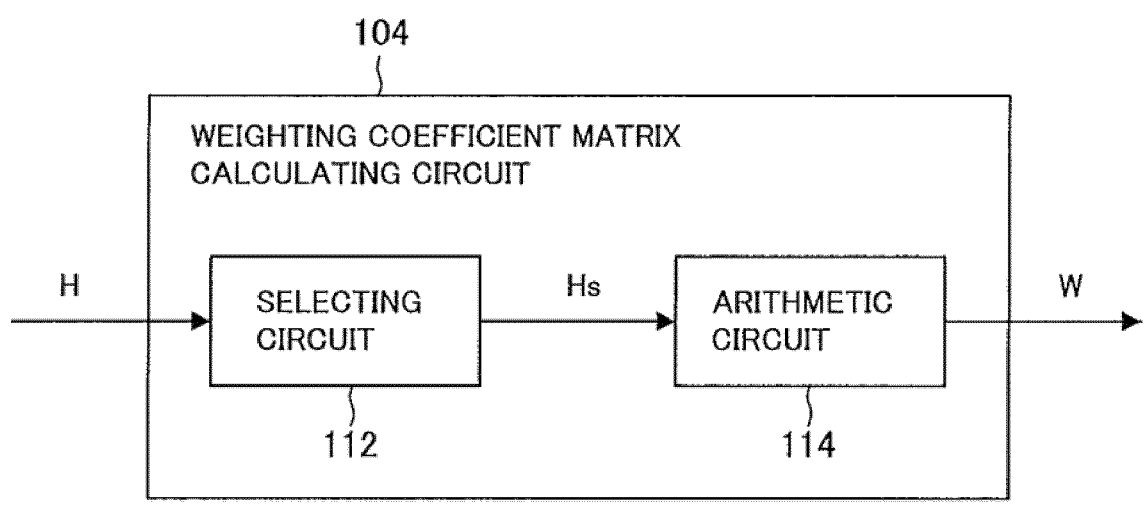
FIG. 2 is a diagram illustrating the structure of a weighting coefficient matrix calculating circuit 104 according to the first embodiment of the present invention.

FIG. 2 is a diagram illustrating the structure of the weighting coefficient matrix calculating circuit 104 according to the first embodiment of the present invention. Hereinafter, the structure of the weighting coefficient matrix calculating circuit 104 according to the first embodiment of the present invention will be described with reference to FIG. 2.

As shown in FIG. 2, the weighting coefficient matrix calculating circuit 104 according to the first embodiment of the present invention includes a selecting circuit 112 and an arithmetic circuit 114.

The selecting circuit 112 appropriately selects S rows from an input channel matrix H of N rows and M columns, and outputs a sub-channel matrix $H_S$. Here, S indicates the maximum value of the number of data streams, and S, N, and M satisfy S<min(M, N). The selecting circuit 112 outputs the sub-channel matrix $H_S$ of S rows and M columns. The sub-channel matrix $H_S$ output from the selecting circuit 112 is transmitted to the arithmetic circuit 114.

The arithmetic circuit 114 calculates the antenna weighting coefficient matrix W for a transmission beam-forming based on the sub-channel matrix $H_S$ transmitted from the selecting circuit 112 and outputs the calculated antenna weighting coefficient matrix. The antenna weighting coefficient matrix W output from the arithmetic circuit 114 is transmitted to the weighting circuit 110. A method of calculating the antenna weighting coefficient matrix W based on the sub-channel matrix $H_S$ in the arithmetic circuit 114 will be described in detail below.

The structure of the weighting coefficient matrix calculating circuit 104 according to the first embodiment of the present invention has been described above with reference to FIG. 2. Next, a method of calculating the antenna weighting coefficient matrix W according to the first embodiment of the present invention will be described.

Figure 3:
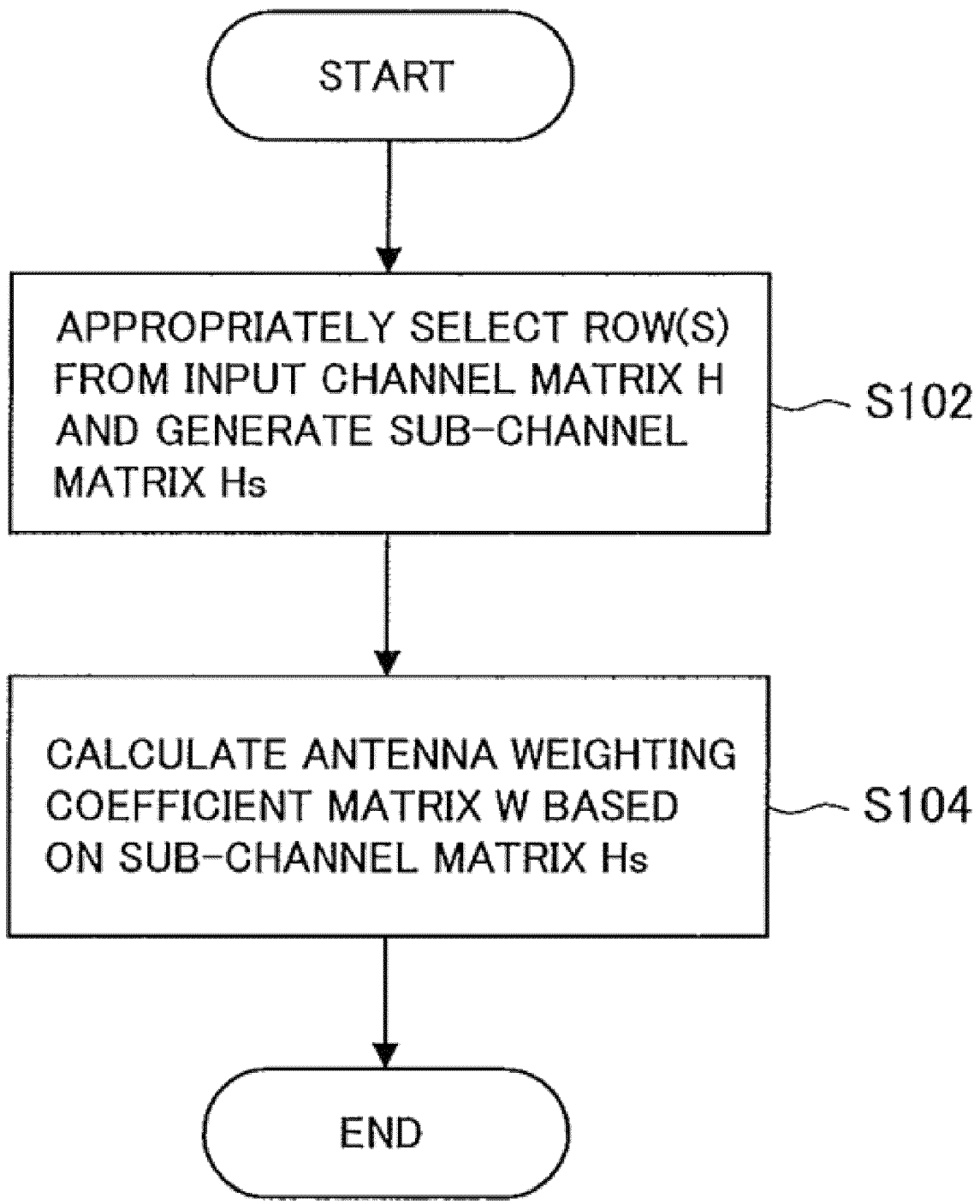
FIG. 3 is a flowchart illustrating a method of calculating an antenna weighting coefficient matrix W according to the first embodiment of the present invention.

FIG. 3 is a flowchart illustrating the method of calculating the antenna weighting coefficient matrix W according to the first embodiment of the present invention. Hereinafter, the method of calculating the antenna weighting coefficient matrix W according to the first embodiment of the present invention will be described with reference to FIG. 3.

When the channel matrix H of N rows and M columns is input to the weighting coefficient matrix calculating circuit 104, the selecting circuit 112 appropriately selects S rows from the channel matrix H and generates a sub-channel matrix $H_s$ (Step S102). When the selecting circuit 112 generates the sub-channel matrix $H_S$, the arithmetic circuit 114 calculates an antenna weighting coefficient matrix W based on the generated sub-channel matrix $H_S$ (Step S104).

Various methods can be used to calculate the antenna weighting coefficient matrix W. However, in this embodiment, for example, a method of calculating the antenna weighting coefficient matrix W using singular value decomposition will be described. When singular value decomposition is performed on the sub-channel matrix $H_S$, the following Expression 8 is established.

$$H_S = UDV^H \qquad \text{(Expression 8)}$$

When a matrix (right singular matrix) V is calculated from $V^H$ of Expression 8, the matrix V becomes the antenna weighting coefficient matrix W.

From the relationship of S<min(M, N), since the rank of the matrix subjected to singular value decomposition is less than that in eigenmode transmission, the amount of calculation of Expression 8 is reduced. In addition, since a matrix U includes S rows and S columns, a matrix D includes S rows and S columns, and the matrix V includes M rows and S columns, the amount of calculation is reduced by a value corresponding to a reduction in the number of elements of the calculated matrix.

Figure 4:
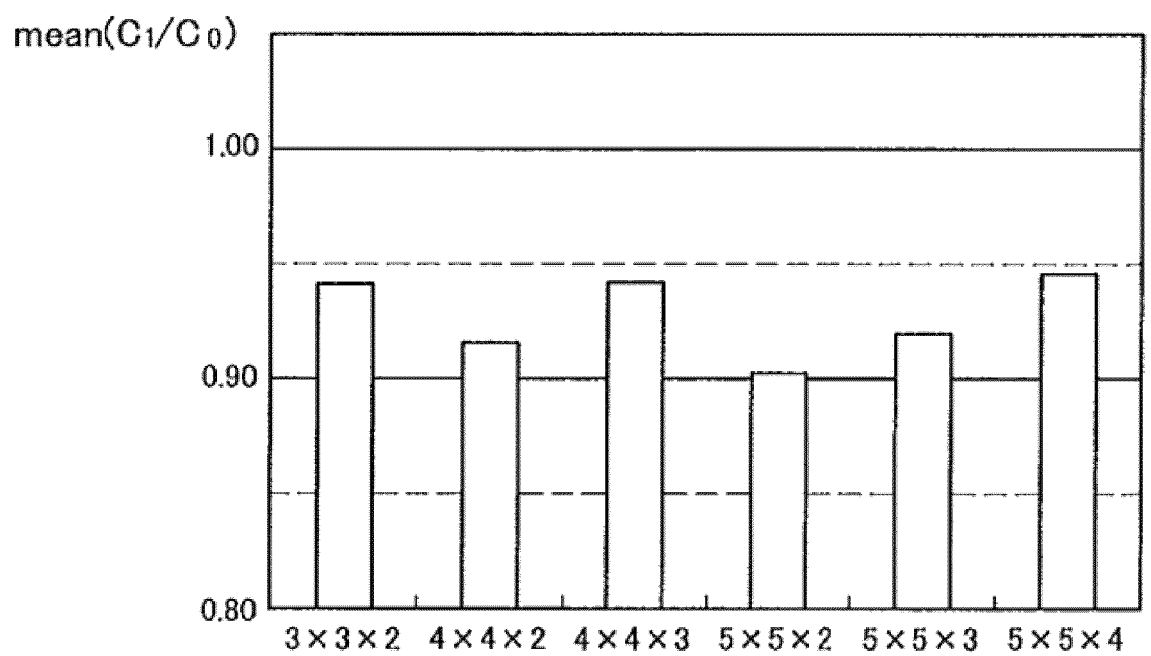
FIG. 4 is a bar graph illustrating the comparison between eigenmode transmission and transmission using the antenna weighting coefficient matrix W calculated by the method of calculating the antenna weighting coefficient matrix W according to the first embodiment of the present invention.

FIG. 4 is a bar graph illustrating the comparison between eigenmode transmission and transmission using the antenna weighting coefficient matrix W calculated by the method of calculating the antenna weighting coefficient matrix W according to the first embodiment of the present invention. FIG. 4 plots the average value of the ratios of communication capacity $C_1$ when S data streams are transmitted by using the antenna weighting coefficient matrix W to communication capacity $C_0$ when S data streams are transmitted by eigenmode transmission ($C_1/C_0$) for 10000 samples. In FIG. 4, when the number of transmitting antennas is M, the number of receiving antennas is N, and the number of rows selected from the channel matrix is S, the ratio of communication capacities is represented by six combinations of M, N, and S. For example, (3×3×2) indicates that the number of transmitting antennas is 3, the number of receiving antennas is 3, and the number of rows selected from the channel matrix is 2.

The communication capacity C is calculated by Expression 9 given below.

$$C = \log_2(\det(I + H_W^H H_W \cdot P/(M\sigma^2)))$$ (Expression 9)

P indicates transmission power, and is 1 in Expression 9. $\sigma^2$ indicates noise power and is 0.1 (SNR=10 dB) in Expression 9. In addition, M indicates the number of transmitting antennas, and I indicates a unitary matrix of S rows and S columns. $H_W$ indicates a weighted channel matrix, and is represented by the following Expression 10. In addition, it is assumed that each element of the channel matrix H has a complex normal distribution with a mean of 0 and a variance of 1.

$$H_W = HW$$ (Expression 10)

As can be seen from FIG. 4, the communication capacity in each case is 90% to 95% of the communication capacity in the eigenmode transmission.

Then, in order to improve the communication capacity, the selecting circuit 112 uses the following patterns. In the channel matrix H of N rows and M columns, the number of matrices capable of selecting S rows from N rows is $_NC_S$. A set of $_NC_S$ matrices is referred to as G(H).

When one matrix $H_0$ ($H_0$ is a matrix of S rows and M columns) is selected from G(H), for example, a large matrix may be selected, and a matrix that is easy to calculate its inverse matrix (a matrix that is ease to calculate its inverse matrix is defined as a matrix having high reversibility) may be selected. In this embodiment, when one matrix $H_0$ is selected from G(H), the following five patterns are used. However, the present invention is not limited to the example in which S rows are selected from N rows.
(Pattern 1)

A matrix whose covariance matrix has the largest minimum value of its eigenvalue (or its singular value) is selected from G(H). That is, when $H_0 \in G(H)$ and the minimum value of the eigenvalue of $H_0^H H_0$ or $H_0 H_0^H$ (or the singular value of $H_0$) is $\lambda_{min}$, a matrix $H_0$ having the largest value of $\lambda_{min}$ is selected, and is output as the sub-channel matrix $H_S$.
(Pattern 2)

A matrix whose covariance matrix has the largest determinant is selected from G(H). That is, a matrix $H_0$ that satisfies $H_0 \in G(H)$ and has the maximum value of $\det(H_0^H H_0)$ is selected and is output as the sub-channel matrix $H_S$. $H_0^H$ indicates a complex conjugate transposed matrix of the matrix $H_0$.
(Pattern 3)

A matrix whose covariance matrix has the largest maximum value of its eigenvalue (or its singular value) is selected from G(H). That is, when $H_0 \in G(H)$ and the maximum value of the eigenvalue of $H_0^H H_0$ or $H_0 H_0^H$ (or the singular value of $H_0$) is $\lambda_{max}$, a matrix $H_0$ having the maximum value of $\lambda_{max}$ is selected, and is output as the sub-channel matrix $H_S$.
(Pattern 4)

A matrix in which the sum of the squares of its elements is the maximum is selected from G(H). That is, a matrix $H_0$ that satisfies $H_0 \in G(H)$ and has the maximum value of trace $(H_0^H H_0)$ is selected and is output as the sub-channel matrix $H_S$.
(Pattern 5)

A matrix that has the maximum value when the determinant of its covariance matrix is divided by the sum of the squares of its elements is selected from G(H). That is, a matrix $H_0$ that satisfies $H_0 \in G(H)$ and has the maximum value of $\det(H_0^H H_0)/\text{trace}(H_0^H H_0)$ is selected and is output as the sub-channel matrix $H_S$. In the pattern 5, a matrix $H_0$ having the maximum value of $\det(H_0^H H_0)^\alpha/\text{trace}(H_0^H H_0)^\beta$ ($\alpha$ and $\beta$ are arbitrary values) may be selected.

A pattern that selects a large matrix corresponds to the patterns 3 and 4, and a pattern that selects a matrix having the highest reversibility corresponds to the patterns 1, 2, and 5.

FIGS. 5A to 5F are bar graphs illustrating the ratio of communication capacities when the sub-channel matrices $H_S$ selected by the patterns 1 to 5 are used to calculate the antenna weighting coefficient matrix W. Similar to FIG. 4, FIGS. 5A to 5F plot the average value of the ratios of the communication capacity $C_1$ when S data streams are transmitted by the antenna weighting coefficient matrix W to the communication capacity $C_0$ when S data streams are transmitted by eigenmode transmission ($C_1/C_0$) for 10000 samples.

In the bar graphs shown in FIGS. 5A to 5F, "sel0" in the horizontal axis indicates characteristics when S rows are appropriately selected from N rows of a channel matrix H of N rows and M columns to generate a sub-channel matrix $H_S$, which are the same as those in FIG. 4. In addition, "sel0" to "sel5" in the horizontal axis indicate characteristics when the sub-channel matrices $H_S$ selected by the patterns 1 to 5 are generated, respectively.

Figure 5A:
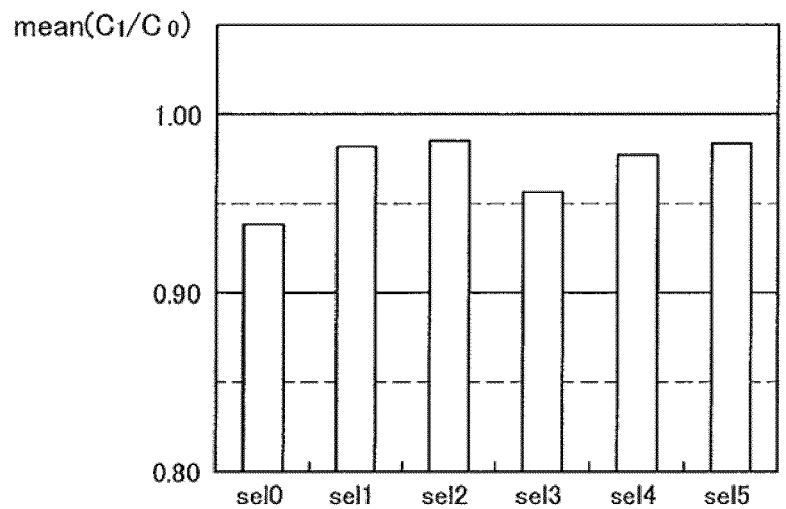
FIG. 5A is a bar graph illustrating the ratio of communication capacities.
Figure 5B:
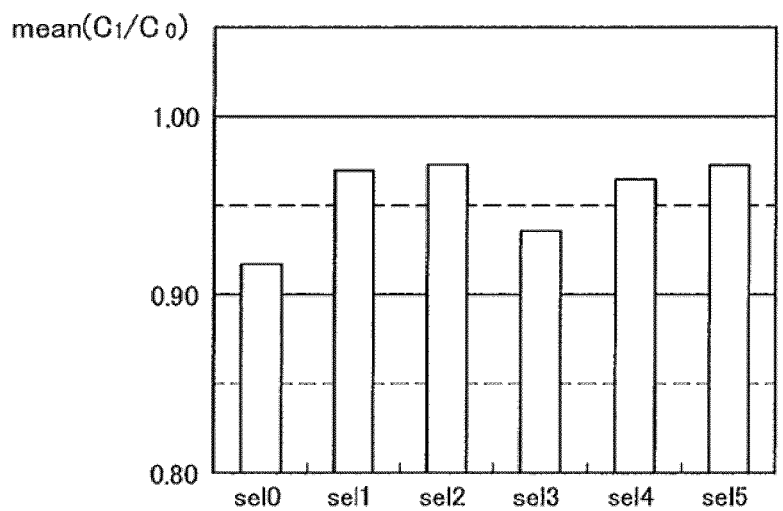
FIG. 5B is a bar graph illustrating the ratio of communication capacities.
Figure 5C:
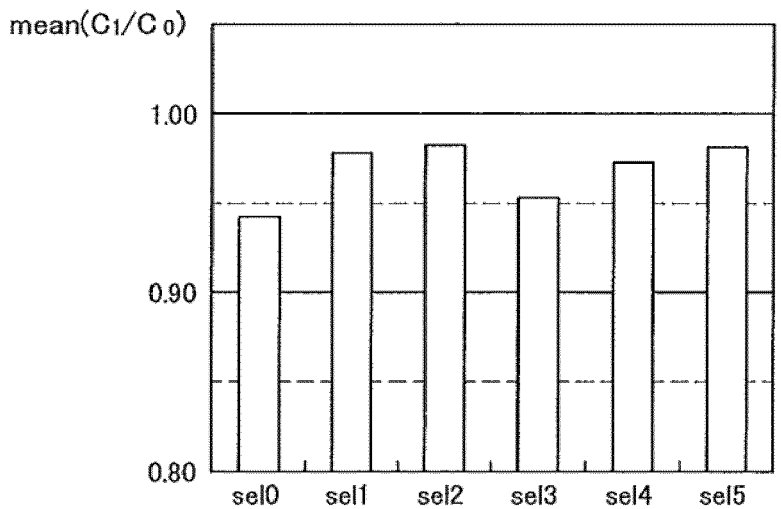
FIG. 5C is a bar graph illustrating the ratio of communication capacities.
Figure 5D:
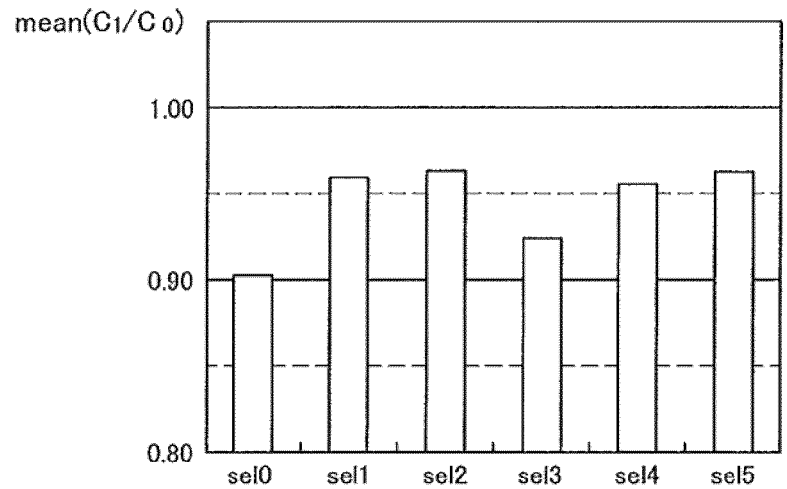
FIG. 5D is a bar graph illustrating the ratio of communication capacities.
Figure 5E:
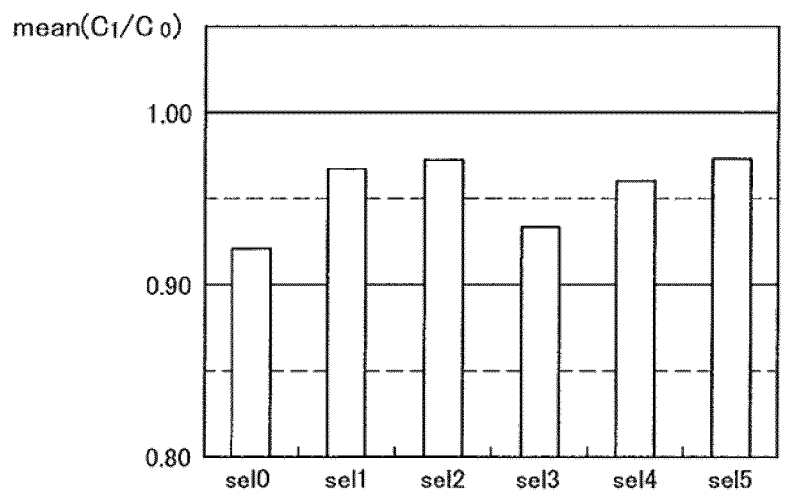
FIG. 5E is a bar graph illustrating the ratio of communication capacities.
Figure 5F:
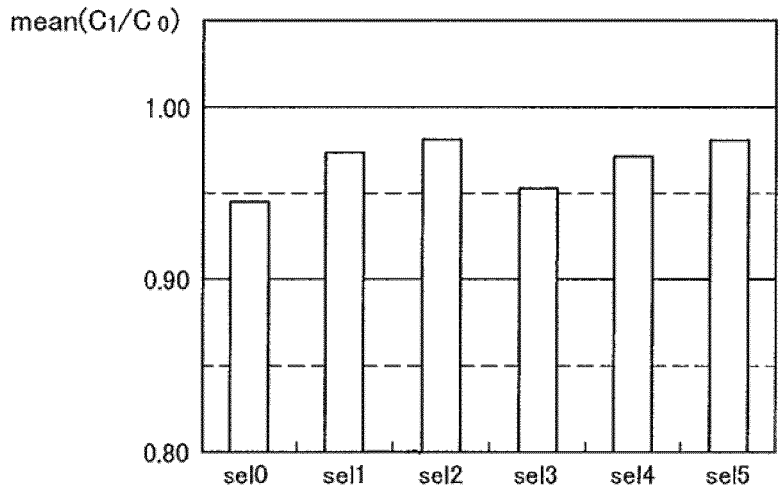
FIG. 5F is a bar graph illustrating the ratio of communication capacities.

FIG. 5A is a bar graph illustrating characteristics when (M×N×S) is (3×3×2), FIG. 5B is a bar graph illustrating characteristics when (M×N×S) is (4×4×2), and FIG. 5C is a bar graph illustrating characteristics when (M×N×S) is (4×4×3). In addition, FIG. 5D is a bar graph illustrating characteristics when (M×N×S) is (5×5×2), FIG. 5E is a bar graph illustrating characteristics when (M×N×S) is (5×5×3), and FIG. 5F is a bar graph illustrating characteristics when (M×N×S) is (5×5×4).

As can be seen from six bar graphs shown in FIGS. 5A to 5F, in all the patterns 1 to 5, communication characteristics are improved as compared to the case in which S rows are appropriately selected from N rows of a channel matrix H of N rows and M columns to generate a sub-channel matrix $H_S$.

The method of calculating the antenna weighting coefficient matrix W according to the first embodiment of the present invention has been described above. As described above, according to the first embodiment of the present invention, when the maximum value of the number of data streams to be subjected to a transmission beam-forming process is smaller than the number of antennas, the antenna weighting coefficient matrix W is calculated based on the sub-channel matrix $H_S$ obtained by extracting the number of rows corresponding to the maximum value of the number of data streams from the channel matrix H.

As such, since the antenna weighting coefficient matrix W is calculated based on the sub-channel matrix $H_S$, it is possible to prevent an increase in the amount of calculation while maintaining characteristics at a certain level. When this wireless communication system is actually mounted to a communication apparatus, the amount of computation depends on the size of a circuit and a computation time. Therefore, it is possible to reduce the size of a circuit and shorten the computation time.

When the sub-channel matrix $H_S$ is generated, it is possible to improve characteristics while minimizing an increase in the amount of computation by giving row selection conditions.

(Second Embodiment)

In the first embodiment, the sub-channel matrix $H_S$ obtained by extracting the number of rows corresponding to the maximum value of the number of data streams from the channel matrix H is input to the arithmetic circuit 114 to calculate the antenna weighting coefficient matrix W. In a second embodiment of the present invention, the channel matrix H and the sub-channel matrix $H_S$ are used to calculate the antenna weighting coefficient matrix W, which will be described below.

Figure 6:
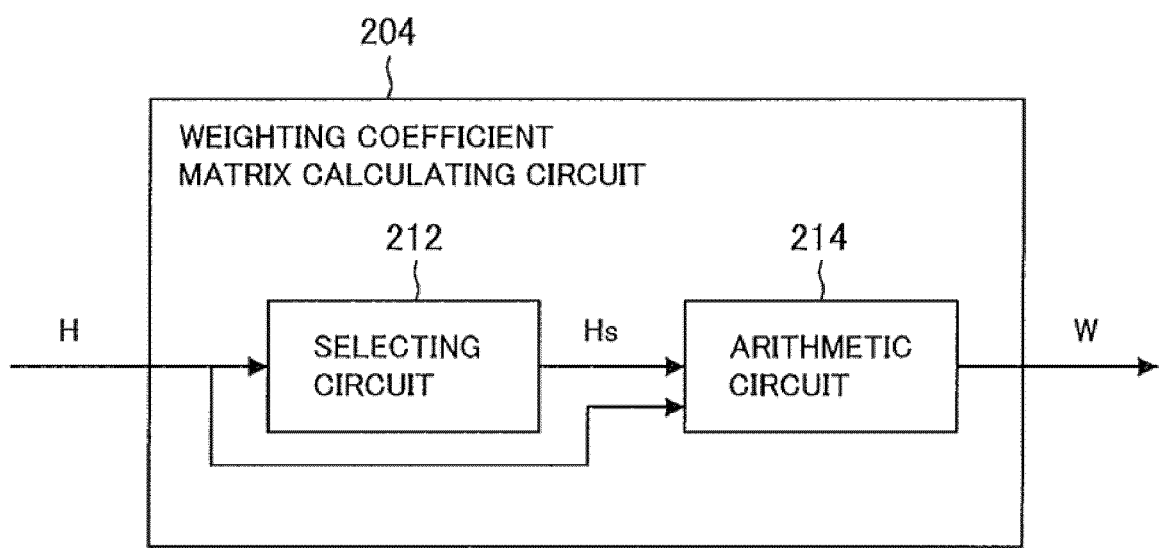
FIG. 6 is a diagram illustrating the structure of a weighting coefficient matrix calculating circuit 204 according to a second embodiment of the present invention.

FIG. 6 is a diagram illustrating the structure of a weighting coefficient matrix calculating circuit 204 according to the second embodiment of the present invention. Hereinafter, the structure of the weighting coefficient matrix calculating circuit 204 according to the second embodiment of the present invention will be described with reference to FIG. 6.

The weighting coefficient matrix calculating circuit 204 shown in FIG. 6 replaces the weighting coefficient matrix calculating circuit 104 in the transmitter 100 shown in FIG. 1. That is, the weighting coefficient matrix calculating circuit 204 receives the channel matrix H estimated by the channel estimating circuit 102, and outputs the antenna weighting coefficient matrix W for a transmission beam-forming.

As shown in FIG. 6, the weighting coefficient matrix calculating circuit 204 includes a selecting circuit 212 and an arithmetic circuit 214.

Similar to the selecting circuit 112 shown in FIG. 2, the selecting circuit 212 appropriately selects S rows from an input channel matrix H of N rows and M columns, and outputs a sub-channel matrix $H_S$. Here, S, N, and M satisfy S<min(M, N). The selecting circuit 212 outputs the sub-channel matrix $H_S$ of S rows and M columns. The sub-channel matrix $H_S$ output from the selecting circuit 212 is transmitted to the arithmetic circuit 214.

The arithmetic circuit 214 receives the channel matrix X estimated by the channel estimating circuit 102 and the sub-channel matrix $H_S$ selected by the selecting circuit 112, calculates the antenna weighting coefficient matrix W for a transmission beam-forming, and outputs the calculated antenna weighting coefficient matrix. The antenna weighting coefficient matrix W output from the arithmetic circuit 214 is transmitted to the weighting circuit 110. A method of calculating the antenna weighting coefficient matrix W based on the sub-channel matrix $H_S$ in the arithmetic circuit 214 will be described in detail below.

The structure of the weighting coefficient matrix calculating circuit 204 according to the second embodiment of the present invention has been described above with reference to FIG. 6. Next, the structure of the arithmetic circuit 214 according to the second embodiment of the present invention will be described.

Figure 7:
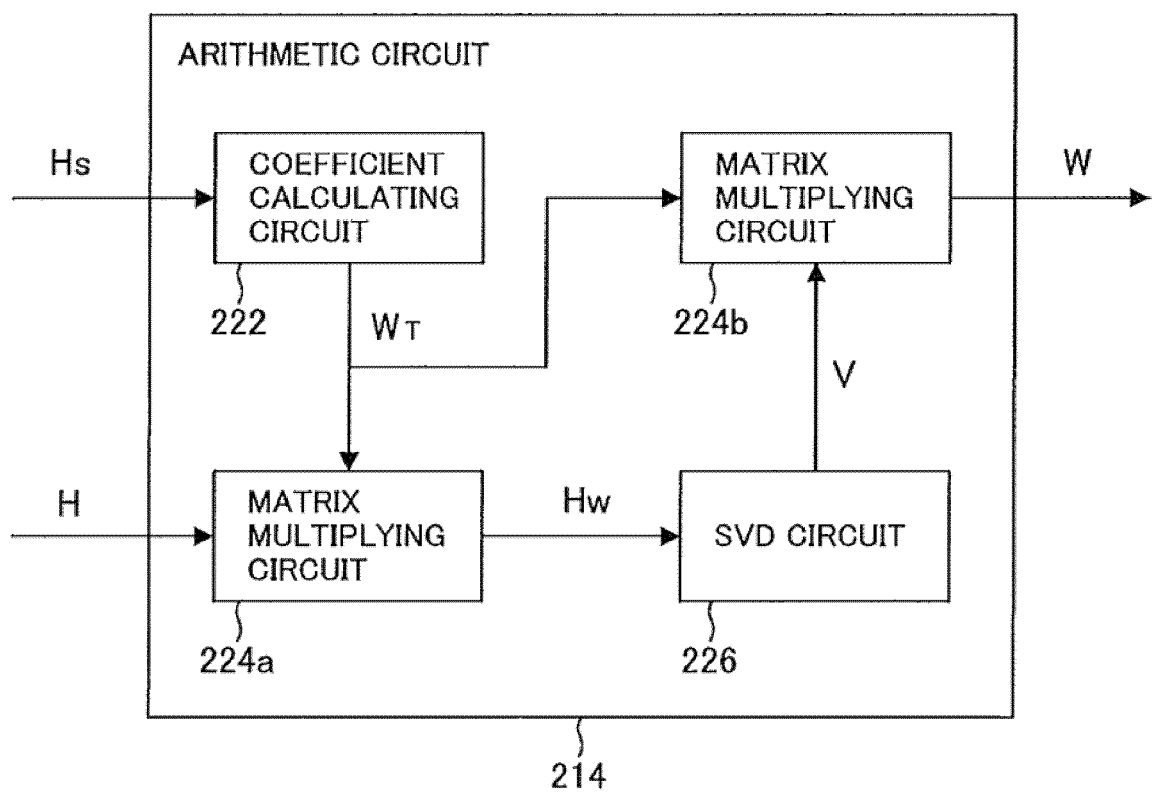
FIG. 7 is a diagram illustrating the structure of an arithmetic circuit 214 according to the second embodiment of the present invention.

FIG. 7 is a diagram illustrating the structure of the arithmetic circuit 214 according to the second embodiment of the present invention. Hereinafter, the structure of the arithmetic circuit 214 according to the second embodiment of the present invention will be described with reference to FIG. 7.

As shown in FIG. 7, the arithmetic circuit 214 according to the second embodiment of the present invention includes a coefficient calculating circuit 222, matrix multiplying circuits 224a and 224b, and an SVD circuit 226.

The coefficient calculating circuit 222 calculates a temporary antenna weighting coefficient matrix $W_T$ based on the sub-channel matrix $H_S$. For example, singular value decomposition may be used as a method of calculating the temporary antenna weighting coefficient matrix $W_T$ in the coefficient calculating circuit 222. When singular value decomposition is performed on the sub-channel matrix $H_S$, the following Expression 11 is obtained.

$$H_S = UDV^H \quad \text{(Expression 11)}$$

When the singular value decomposition is performed to calculate the temporary antenna weighting coefficient matrix $W_T$, the coefficient calculating circuit 222 uses the matrix (right singular matrix) V of Expression 11 as the temporary antenna weighting coefficient matrix $W_T$. The coefficient calculating circuit 222 outputs the calculated temporary antenna weighting coefficient matrix $W_T$ to the matrix multiplying circuits 224a and 224b.

The matrix multiplying circuit 224a is for multiplying matrices. The matrix multiplying circuit 224a according to this embodiment multiplies the channel matrix H estimated by the channel estimating circuit 102 by the temporary antenna weighting coefficient matrix $W_T$ calculated by the coefficient calculating circuit 222 to generate a weighted channel matrix $H_W$ ($H_W=HW_T$). The matrix $H_w$ includes M rows and S columns. The weighted channel matrix $H_W$ generated by the matrix multiplying circuit 224a is output to the SVD circuit 226.

The SVD circuit 226 is for performing singular value decomposition. In this embodiment, the SVD circuit 226 receives the weighted channel matrix $H_W$ generated by the matrix multiplying circuit 224a and performs the singular value decomposition on the weighted channel matrix $H_W$. When the singular value decomposition is performed on the weighted channel matrix $H_W$, the following Expression 12 is obtained.

$$H_W = UDV^H \quad \text{(Expression 12)}$$

The matrix (right singular matrix) V obtained by the Expression 12 is output to the matrix multiplying circuit 224b.

The matrix multiplying circuit 224b is for multiplying matrices. The matrix multiplying circuit 224b according to this embodiment multiplies the temporary antenna weighting coefficient matrix $W_T$ calculated by the coefficient calculating circuit 222 by the matrix V calculated by the SVD circuit 226 to generate the antenna weighting coefficient matrix W ($W=W_TV$).

The structure of the arithmetic circuit 214 according to the second embodiment of the present invention has been described with reference to FIG. 7. Next, a method of calculating the antenna weighting coefficient matrix W according to the second embodiment of the present invention will be described.

Figure 8:
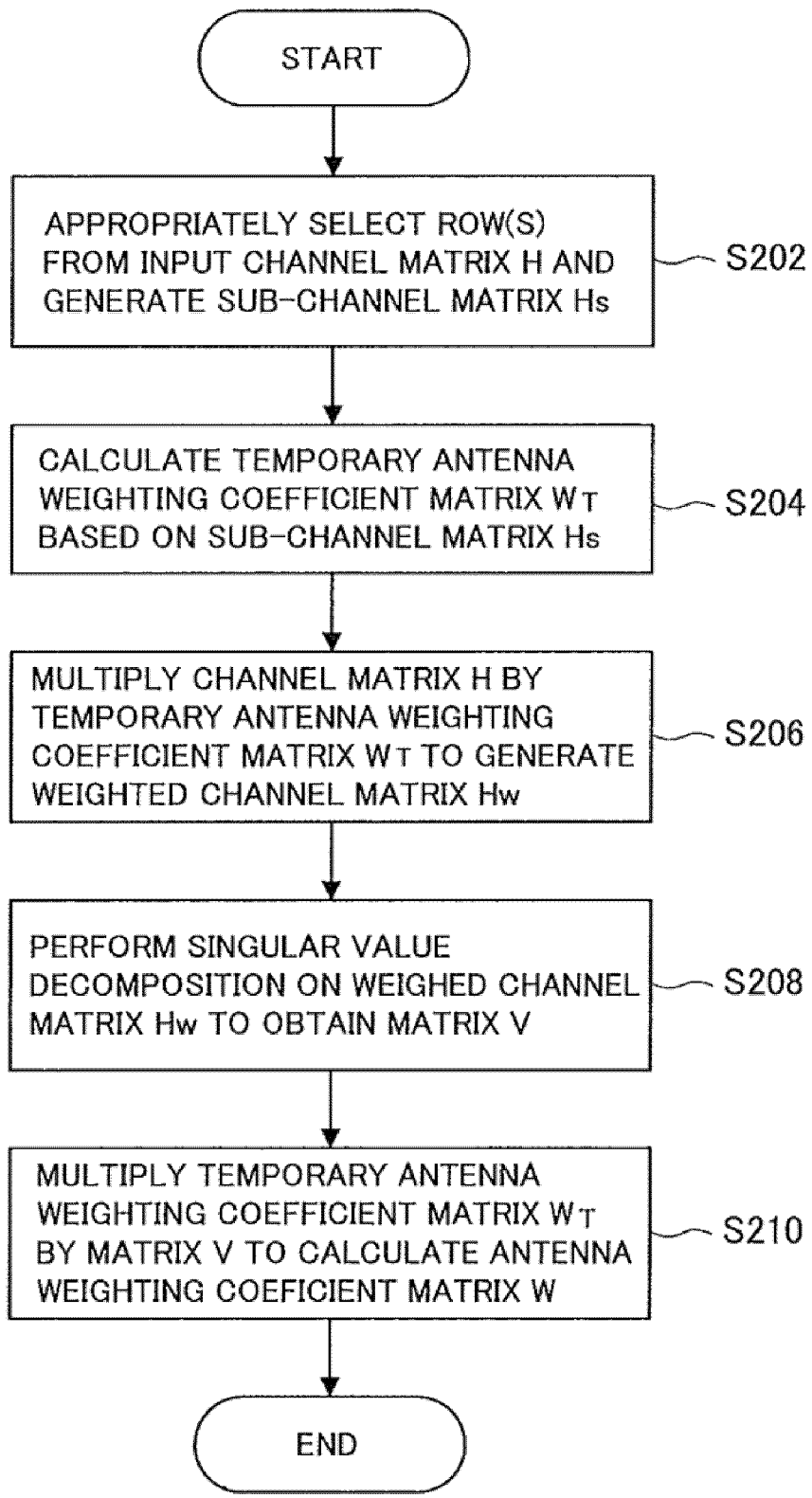
FIG. 8 is a flowchart illustrating a method of calculating an antenna weighting coefficient matrix W according to the second embodiment of the present invention.

FIG. 8 is a flowchart illustrating the method of calculating the antenna weighting coefficient matrix W according to the second embodiment of the present invention. Hereinafter, the method of calculating the antenna weighting coefficient matrix W according to the second embodiment of the present invention will be described with reference to FIG. 8.

When a channel matrix H of N rows and M columns is input to the weighting coefficient matrix calculating circuit 204, the selecting circuit 212 appropriately selects S rows from the channel matrix H and generates a sub-channel matrix $H_s$ (Step S202). When the selecting circuit 212 generates the sub-channel matrix $H_S$, the coefficient calculating circuit 222 calculates the temporary antenna weighting coefficient matrix $W_T$ based on the generated sub-channel matrix $H_S$ (Step S204). As described above, for example, the coefficient calculating circuit 222 can use singular value decomposition to calculate the temporary antenna weighting coefficient matrix $W_T$.

When the temporary antenna weighting coefficient matrix $W_T$ is completely generated in Step S204, the matrix multiplying circuit 224a multiplies the channel matrix H by the temporary antenna weighting coefficient matrix $W_T$ to generate the weighted channel matrix $H_W$ (Step S206). As such, the weighted channel matrix $H_W$ is generated, and an antenna weighting coefficient matrix most suitable for the channel matrix H is calculated again.

When the weighted channel matrix $H_W$ is generated in Step S206, the SVD circuit 226 performs singular value decomposition on the weighted channel matrix $H_W$ to obtain the matrix V (Step S208).

When the singular value decomposition is performed on the weighted channel matrix $H_W$ in Step S208, the matrix multiplying circuit 224b multiplies the temporary antenna weighting coefficient matrix $W_T$ generated in Step S204 by the matrix V obtained in Step S208 to calculate the antenna weighting coefficient matrix W (Step S210). The rows that are not used in the calculation of the temporary antenna weighting coefficient matrix $W_T$ (that is, the rows of the channel matrix H that are not included in the sub-channel matrix $H_S$) are used to calculate the antenna weighting coefficient matrix W. Therefore, it is possible to improve characteristics.

From the relationship of S<min(M, N), since the rank of the matrix subjected to singular value decomposition is less than that in eigenmode transmission, the amount of calculation is reduced by a value corresponding to the reduction in the rank of the matrix. In addition, the amount of calculation is reduced by a value corresponding to a reduction in the number of elements of the matrix generated by the singular value decomposition. As described above, the total number of processes is increased, but the amount of calculation of the complicated singular value decomposition process is reduced. Therefore, it is possible to prevent an increase in the total amount of computation.

In addition, the coefficient calculating circuit 222 and the SVD circuit 226 may be integrated with each other according to conditions.

Figure 9:
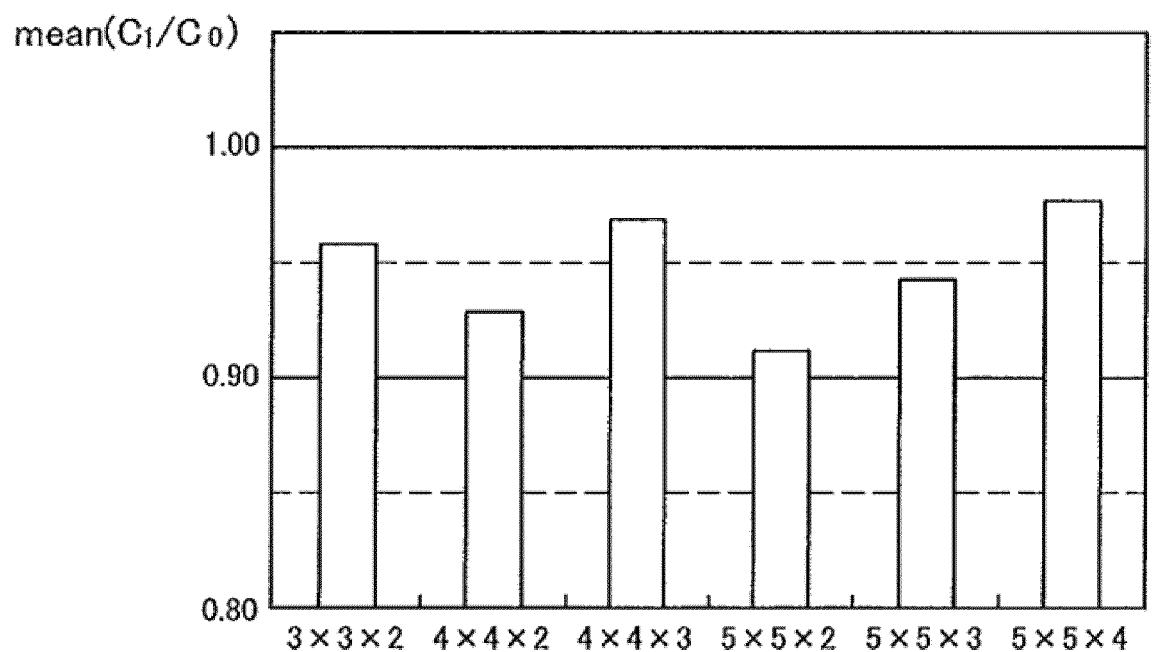
FIG. 9 is a bar graph illustrating the comparison between eigenmode transmission and transmission using the antenna weighting coefficient matrix W calculated by the method of calculating the antenna weighting coefficient matrix W according to the second embodiment of the present invention.

FIG. 9 is a bar graph illustrating the comparison between eigenmode transmission and transmission using the antenna weighting coefficient matrix W calculated by the method of calculating the antenna weighting coefficient matrix W according to the second embodiment of the present invention. FIG. 9 plots the average value of the ratios of communication capacity $C_1$ when S data streams are transmitted by using the antenna weighting coefficient matrix W to communication capacity $C_0$ when S data streams are transmitted by eigenmode transmission ($C_1/C_0$) for 10000 samples. In FIG. 9, when the number of transmitting antennas is M, the number of receiving antennas is N, and the number of rows selected from the channel matrix is S, the ratio of communication capacities is represented by six combinations of M, N, and S. For example, (3×3×2) indicates that the number of transmitting antennas is 3, the number of receiving antennas is 3, and the number of rows selected from the channel matrix is 2.

The communication capacity C is calculated by the above-mentioned Expression 9. In addition, it is assumed that each element of the channel matrix H has a complex normal distribution with a mean of 0 and a variance of 1.

As can be seen from FIG. 9, the communication capacity in each case is 90% to 95% of the communication capacity in the eigenmode transmission.

Next, the operation of the selecting circuit 212 selecting S rows from the channel matrix H by the patterns 1 to 5 described in the first embodiment of the present invention in order to improve the communication capacity will be described.

FIGS. 10A to 10F are bar graphs illustrating the ratio of communication capacities when the sub-channel matrices $H_S$ selected by the patterns 1 to 5 are used to calculate the antenna weighting coefficient matrix W. Similar to FIG. 9, FIGS. 10A to 10F plot the average value of the ratios of the communication capacity $C_1$ when S data streams are transmitted by using the antenna weighting coefficient matrix W to the communication capacity $C_0$ when S data streams are transmitted by eigenmode transmission ($C_1/C_0$) for 10000 samples.

In the bar graphs shown in FIGS. 10A to 10F, "sel0" in the horizontal axis indicates characteristics when S rows are appropriately selected from N rows of the channel matrix H of N rows and M columns to generate the sub-channel matrix $H_S$, which are the same as those in FIG. 4. In addition, "sel0" to "sel5" in the horizontal axis indicate characteristics when the sub-channel matrices $H_S$ selected by the patterns 1 to 5 are generated, respectively.

Figure 10A:
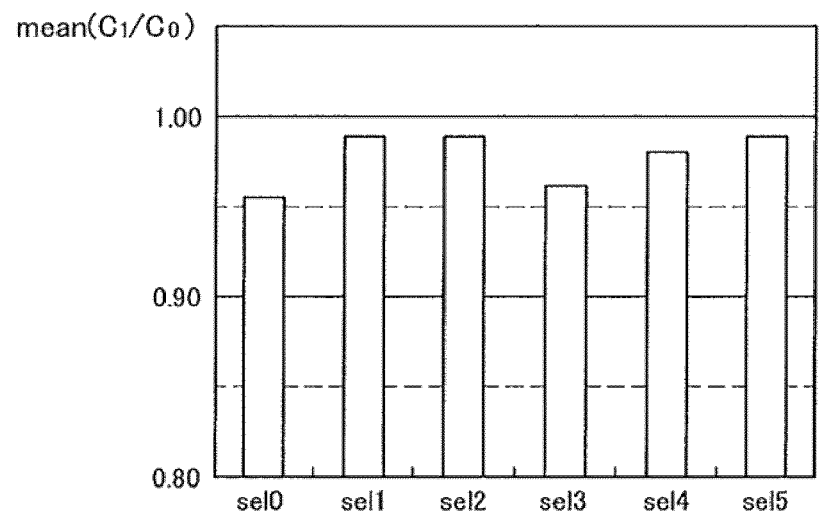
FIG. 10A is a bar graph illustrating the ratio of communication capacities.
Figure 10B:
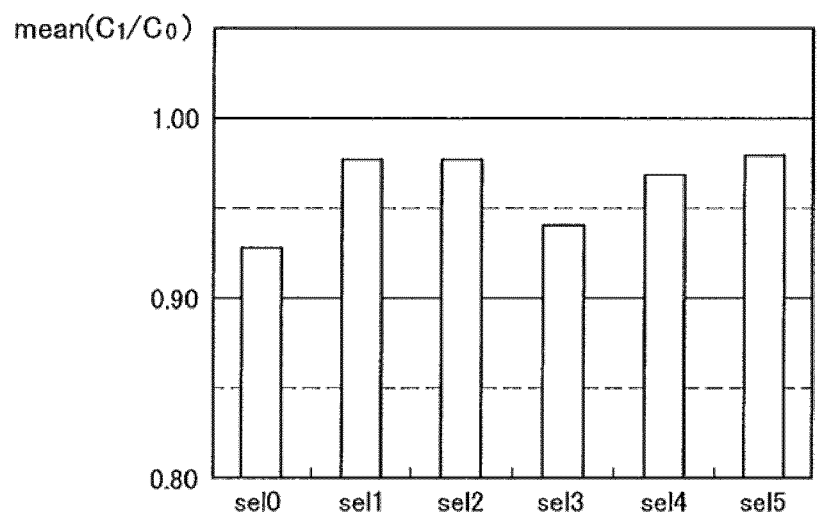
FIG. 10B is a bar graph illustrating the ratio of communication capacities.
Figure 10C:
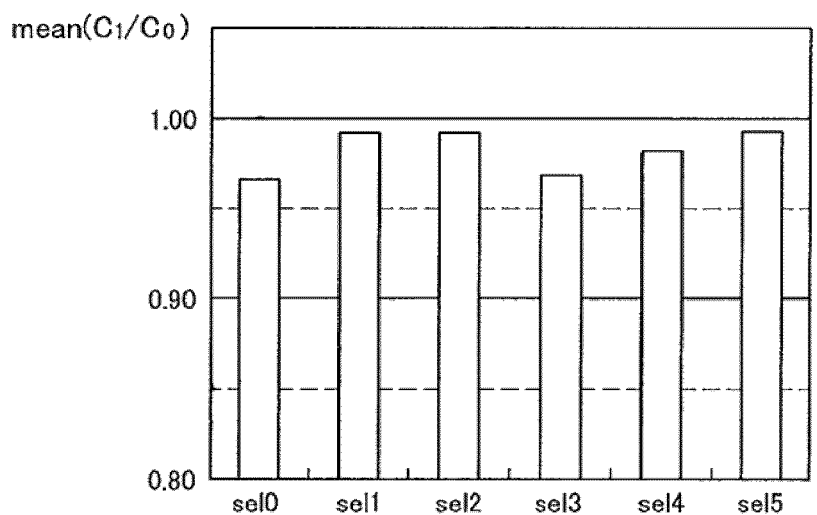
FIG. 10C is a bar graph illustrating the ratio of communication capacities.
Figure 10D:
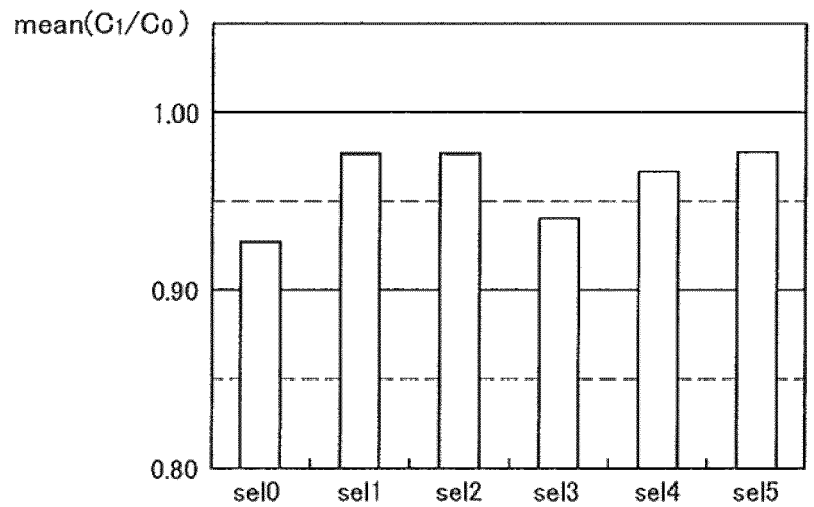
FIG. 10D is a bar graph illustrating the ratio of communication capacities.
Figure 10E:
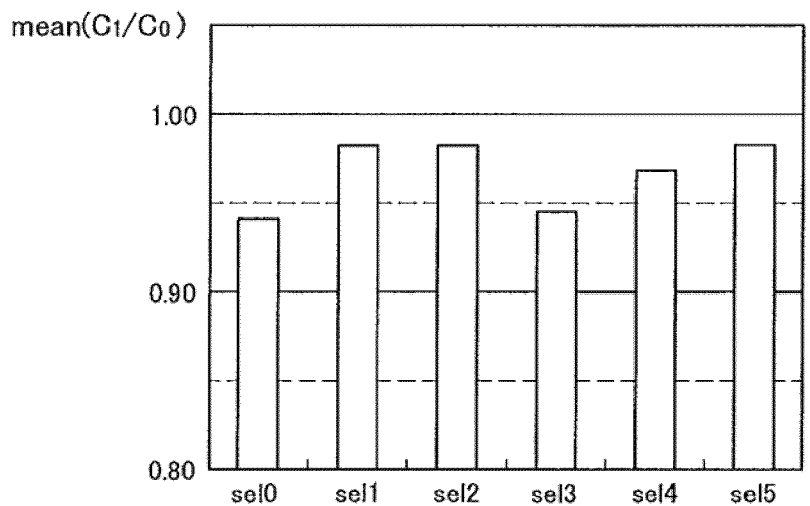
FIG. 10E is a bar graph illustrating the ratio of communication capacities.
Figure 10F:
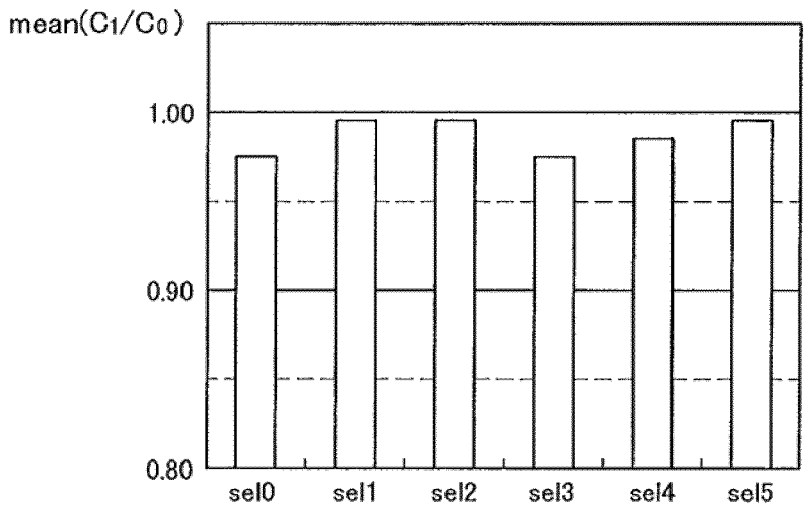
FIG. 10F is a bar graph illustrating the ratio of communication capacities.

FIG. 10A is a bar graph illustrating characteristics when (M×N×S) is (3×3×2), FIG. 10B is a bar graph illustrating characteristics when (M×N×S) is (4×4×2), and FIG. 10C is a bar graph illustrating characteristics when (M×N×S) is (4×4×3). In addition, FIG. 10D is a bar graph illustrating characteristics when (M×N×S) is (5×5×2), FIG. 10E is a bar graph illustrating characteristics when (M×N×S) is (5×5×3), and FIG. 10F is a bar graph illustrating characteristics when (M×N×S) is (5×5×4).

As can be seen from six bar graphs shown in FIGS. 10A to 10F, in all the patterns 1 to 5, communication characteristics are improved as compared to the case in which S rows are appropriately selected from N rows of the channel matrix H of N rows and M columns to generate the sub-channel matrix $H_S$.

The method of calculating the antenna weighting coefficient matrix W according to the second embodiment of the present invention has been described with reference to FIG. 8. As described above, according to the second embodiment of the present invention, when the maximum value of the number of data streams to be subjected to a transmission beamforming process is smaller than the number of antennas, the antenna weighting coefficient matrix W is calculated based on the channel matrix H and the sub-channel matrix $H_S$ obtained by extracting the number of rows corresponding to the maximum value of the number of data streams from the channel matrix H.

As such, since the antenna weighting coefficient matrix W is calculated based on the channel matrix H and the sub-channel matrix $H_S$, it is possible to prevent an increase in the amount of calculation while maintaining characteristics at a certain level. In addition, in the second embodiment, it is possible to obtain good communication characteristics, as compared to the first embodiment. When this wireless communication system is actually mounted to a communication apparatus, the amount of computation depends on the size of a circuit and a computation time. Therefore, it is possible to reduce the size of a circuit and shorten the computation time.

When the sub-channel matrix $H_S$ is generated, it is possible to improve characteristics while minimizing an increase in the amount of computation by giving row selection conditions, similar to the first embodiment.

(Third Embodiment)

In the second embodiment of the present invention, the channel matrix H and the sub-channel matrix $H_S$ obtained by extracting the number of rows corresponding to the maximum value of the number of data streams from the channel matrix H are input to the arithmetic circuit 214 to calculate the antenna weighting coefficient matrix W. In a third embodiment of the present invention, similar to the second embodiment of the present invention, the channel matrix H and the sub-channel matrix $H_S$ are used to calculate the antenna weighting coefficient matrix W. In this embodiment, a reverse antenna weighting coefficient matrix is calculated by matrix transposition, and the antenna weighting coefficient matrix W is calculated by matrix transposition, which will be described below.

Figure 11:
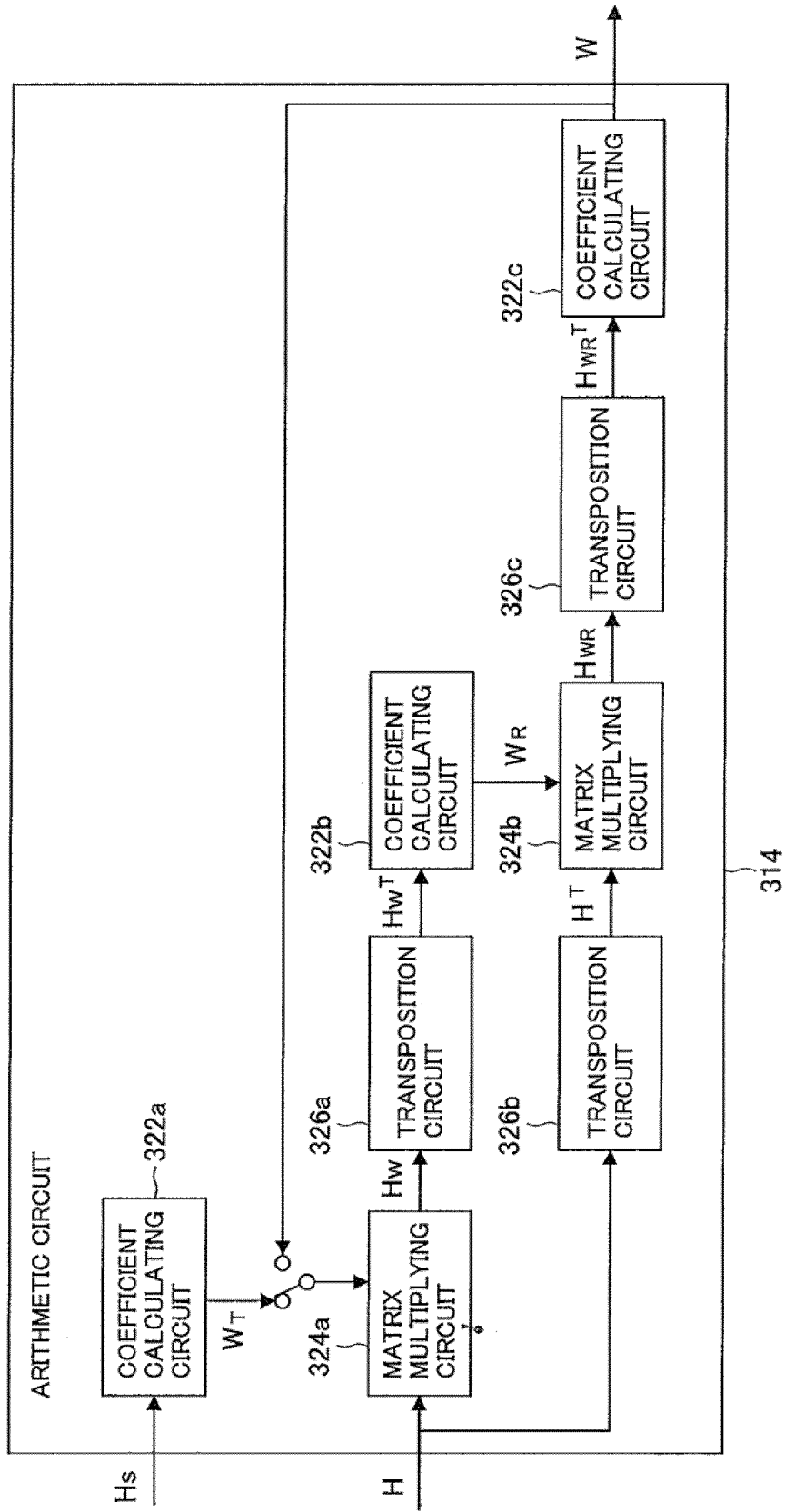
FIG. 11 is a diagram illustrating the structure of an arithmetic circuit 314 according to a third embodiment of the present invention.

FIG. 11 is a diagram illustrating the structure of an arithmetic circuit 314 according to the third embodiment of the present invention. Hereinafter, the structure of the arithmetic circuit 314 according to the third embodiment of the present invention will be described with reference to FIG. 11.

The arithmetic circuit 314 shown in FIG. 11 replaces the arithmetic circuit 214 according to the second embodiment of the present invention shown in FIG. 6. That is, the arithmetic circuit 314 receives the sub-channel matrix $H_S$ selected by the selecting circuit 212 and the channel matrix H estimated by the channel estimating circuit 102, and outputs the antenna weighting coefficient matrix W for a transmission beamforming.

As shown in FIG. 11, the arithmetic circuit 314 according to the third embodiment of the present invention includes coefficient calculating circuits 322a, 322b, and 322c, matrix multiplying circuits 324a and 324b, and transposition circuits 326a, 326b, and 326c.

The coefficient calculating circuit 322a calculates a temporary antenna weighting coefficient matrix $W_T$ based on the sub-channel matrix $H_S$. For example, the coefficient calculating circuit 322a can use singular value decomposition to calculate the temporary antenna weighting coefficient matrix $W_T$. When singular value decomposition is performed on the sub-channel matrix $H_S$, the above-mentioned Expression 11 is obtained.

When the temporary antenna weighting coefficient matrix $W_T$ is calculated by singular value decomposition, the coefficient calculating circuit 322a uses the matrix V of the Expression 11 as the temporary antenna weighting coefficient matrix $W_T$. The coefficient calculating circuit 322a outputs the calculated temporary antenna weighting coefficient matrix $W_T$ to the matrix multiplying circuit 324a.

The matrix multiplying circuit 324a is for multiplying matrices. The matrix multiplying circuit 324a according to this embodiment multiplies the channel matrix H estimated by the channel estimating circuit 102 by the temporary antenna weighting coefficient matrix $W_T$ calculated by the coefficient calculating circuit 322a to generate a weighted channel matrix $H_W$ ($H_W=HW_T$). In this case, $H_W$ indicates a matrix of M rows and S columns. The weighted channel matrix $H_W$ generated by the matrix multiplying circuit 324a is output to the transposition circuit 326a.

The transposition circuit 326a is for transposing a matrix. The transposition circuit 326a according to this embodiment receives the weighted channel matrix $H_W$ generated by the matrix multiplying circuit 324a, transposes the weighted channel matrix $H_W$, and outputs a transposed weighted channel matrix $H_W^T$. The transposed weighted channel matrix $H_W^T$ is input to the coefficient calculating circuit 322b.

The coefficient calculating circuit 322b calculates a reverse antenna weighting coefficient matrix $W_R$ based on the transposed weighted channel matrix $H_W^T$ output from the transposition circuit 326a. For example, the coefficient calculating circuit 322b can use singular value decomposition to calculate the reverse antenna weighting coefficient matrix $W_R$. When singular value decomposition is performed on the transposed weighted channel matrix $H_W^T$, the following Expression 13 is obtained.

$$H_W^T = UDV^H \quad \text{(Expression 13)}$$

When the reverse antenna weighting coefficient matrix $W_R$ is calculated by singular value decomposition, the coefficient calculating circuit 322b uses the matrix (right singular matrix) V of Expression 13 as the reverse antenna weighting coefficient matrix $W_R$. The coefficient calculating circuit 322b outputs the calculated reverse antenna weighting coefficient matrix $W_R$ to the matrix multiplying circuit 324b.

The transposition circuit 326b is for transposing a matrix. The transposition circuit 326b according to this embodiment receives the channel matrix H estimated by the channel estimating circuit 102, transposes the channel matrix H, and outputs a transposed channel matrix $H^T$. The transposed channel matrix $H^T$ is input to the matrix multiplying circuit 324b.

The matrix multiplying circuit 324b is for multiplying matrices. The matrix multiplying circuit 324b according to this embodiment multiplies the reverse antenna weighting coefficient matrix $W_R$ output from the coefficient calculating circuit 322b by the transposed channel matrix $H^T$ output from the transposition circuit 326b to generate a reverse weighted channel matrix $H_{WR}$ ($H_{WR}=H^TW_R$). In the case, the reverse weighted channel matrix $H_{WR}$ includes N rows and S columns. The reverse weighted channel matrix $H_{WR}$ generated by the matrix multiplying circuit 324b is input to the transposition circuit 326c.

The transposition circuit 326c is for transposing a matrix. The transposition circuit 326c according to this embodiment transposes the reverse weighted channel matrix $H_{WR}$ generated by the matrix multiplying circuit 324b to generate a transposed reverse weighted channel matrix $H_{WR}^T$. The transposed reverse weighted channel matrix $H_{WR}^T$ is input to the coefficient calculating circuit 322c.

The coefficient calculating circuit 322c receives the transposed reverse weighted channel matrix $H_{WR}^T$ output from the transposition circuit 326c, and generates the antenna weighting coefficient matrix W based on the transposed reverse weighted channel matrix $H_{WR}^T$. For example, the coefficient calculating circuit 322c can use singular value decomposition to calculate the antenna weighting coefficient matrix W. When singular value decomposition is performed on the transposed reverse weighted channel matrix $H_{WR}^T$, the following Expression 14 is obtained.

$$H_{WR}^T = UDV^H \quad \text{(Expression 14)}$$

When the antenna weighting coefficient matrix W is calculated by singular value decomposition, the coefficient calculating circuit 322c uses the matrix (right singular matrix) V of Expression 14 as the antenna weighting coefficient matrix W. The coefficient calculating circuit 322c outputs the calculated antenna weighting coefficient matrix W to the weighting circuit 110.

The antenna weighting coefficient matrix W output from the coefficient calculating circuit 322c may be input to the matrix multiplying circuit 324a again. It is possible to improve communication characteristics by repeatedly performing a computing process using the antenna weighting coefficient matrix W output from the coefficient calculating circuit 322c.

The structure of the arithmetic circuit 314 according to the third embodiment of the present invention has been described above with reference to FIG. 11. Next, a method of calculating the antenna weighting coefficient matrix W according to the third embodiment of the present invention will be described.

FIG. 12 is a flowchart illustrating the method of calculating the antenna weighting coefficient matrix W according to the third embodiment of the present invention. Hereinafter, the method of calculating the antenna weighting coefficient matrix W according to the third embodiment of the present invention will be,described with reference to FIG. 12.

When the channel matrix H of N rows and M columns is input to the weighting coefficient matrix calculating circuit 204, the selecting circuit 212 appropriately selects S rows from the channel matrix H and generates the sub-channel matrix $H_S$ (Step S302). When the selecting circuit 212 generates the sub-channel matrix $H_S$, the coefficient calculating circuit 322a calculates the temporary antenna weighting coefficient matrix $W_T$ based on the generated sub-channel matrix $H_S$ (Step S304). As described above, for example, the coefficient calculating circuit 322a can use singular value decomposition to calculate the temporary antenna weighting coefficient matrix $W_T$.

When the temporary antenna weighting coefficient matrix $W_T$ is completely generated in Step S304, the matrix multiplying circuit 324a multiplies the channel matrix H by the temporary antenna weighting coefficient matrix $W_T$ to generate the weighted channel matrix $H_W$ (Step S306).

When the weighted channel matrix $H_W$ is generated in Step S306, the transposition circuit 326a transposes the weighted channel matrix $H_W$, and the coefficient calculating circuit 322b performs singular value decomposition on the transposed weighted channel matrix $H_W^T$ to generate the reverse antenna weighting coefficient matrix $W_R$ (Step S308).

When the reverse antenna weighting coefficient matrix $W_R$ is generated in Step S308, the matrix multiplying circuit 324b multiplies the transposed channel matrix $H^T$ transposed from the channel matrix H by the transposition circuit 326b by the reverse antenna weighting coefficient matrix $W_R$. The reverse weighted channel matrix $H_{WR}$ is obtained by the multiplication of the transposed channel matrix $H^T$ and the reverse antenna weighting coefficient matrix $W_R$ (Step S310).

When the reverse weighted channel matrix $H_{WR}$ is obtained in Step S310, the transposition circuit 326c transposes the reverse weighted channel matrix $H_{WR}$ to obtain the transposed reverse weighted channel matrix $H_{WR}^T$. Then, the coefficient calculating circuit 322c performs singular value decomposition on the transposed reverse weighted channel matrix $H_{WR}^T$ to calculate the antenna weighting coefficient matrix W (Step 312).

In this way, finally, the matrix is transposed to obtain the antenna weighting coefficient matrix W. Therefore, it is possible to obtain the same effects as those when the arithmetic circuit 314 performs a two-way beam-forming process.

From the relationship of S<min(M, N), since the rank of the matrix subjected to singular value decomposition is less than that in eigenmode transmission, the amount of calculation is reduced by a value corresponding to the reduction in the rank of the matrix. In addition, the amount of calculation is reduced by a value corresponding to a reduction in the number of elements of the matrix generated by the singular value decomposition. In addition, in order to improve communication characteristics, Step S306 to Step S312 may be repeatedly performed using the antenna weighting coefficient matrix W output from the coefficient calculating circuit 322c. As described above, the total number of processes is increased, but the amount of calculation of the complicated singular value decomposition process is reduced. Therefore, it is possible to prevent an increase in the total amount of computation.

The coefficient calculating circuits 322a, 322b, and 322c may be integrated with each other, the matrix multiplying circuits 324a, 324b, and 324c may be integrated with each other, and the transposition circuits 326a, 326b, and 326c may be integrated with each other according to conditions.

FIGS. 13A to 13F are line graphs illustrating the comparison between eigenmode transmission and transmission using the antenna weighting coefficient matrix W calculated by the method of calculating the antenna weighting coefficient matrix W according to the third embodiment of the present invention. FIGS. 13A to 13F plot the maximum value and the minimum value of the ratios of communication capacity $C_1$ when S data streams are transmitted by the antenna weighting coefficient matrix W to communication capacity $C_0$ when S data streams are transmitted by eigenmode transmission ($C_1/C_0$) for 10000 samples. In the line graphs, the horizontal axis indicates the number of times Steps S306 to S312 are repeated. In addition, the number of repetitions is zero when the temporary antenna weighting matrix $W_T$ calculated by the coefficient calculating circuit 322a is used instead of the antenna weighting coefficient matrix W.

In FIGS. 13A to 13F, when the number of transmitting antennas is M, the number of receiving antennas is N, and the number of rows selected from the channel matrix is S, the ratio of communication capacities is represented by six combinations of M, N, and S.

Here, the communication capacity C is calculated by the above-mentioned Expression 9. In addition, it is assumed that each element of the channel matrix H has a complex normal distribution with a mean of 0 and a variance of 1.

Figure 13A:
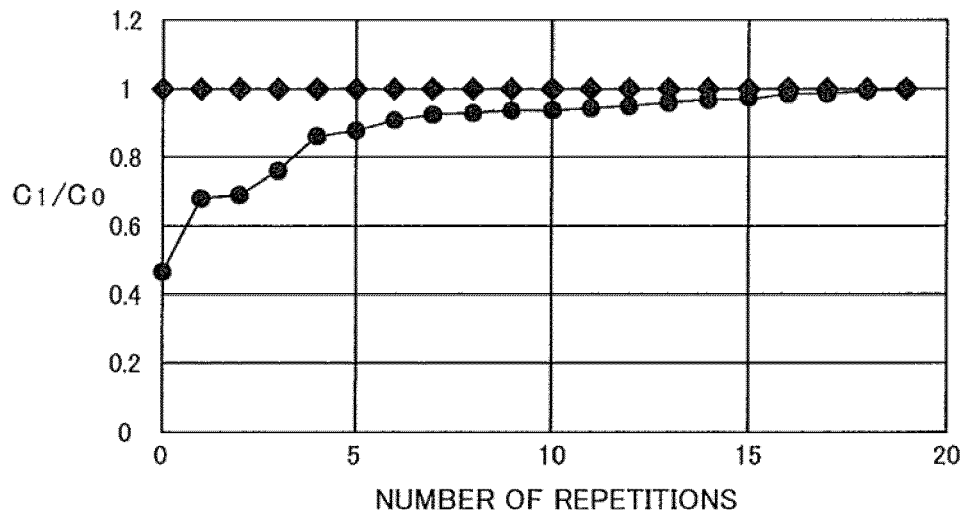
FIG. 13A is a line graph illustrating the comparison between eigenmode transmission and transmission using the antenna weighting coefficient matrix W calculated by the method of calculating the antenna weighting coefficient matrix W according to the third embodiment of the present invention.
Figure 13B:
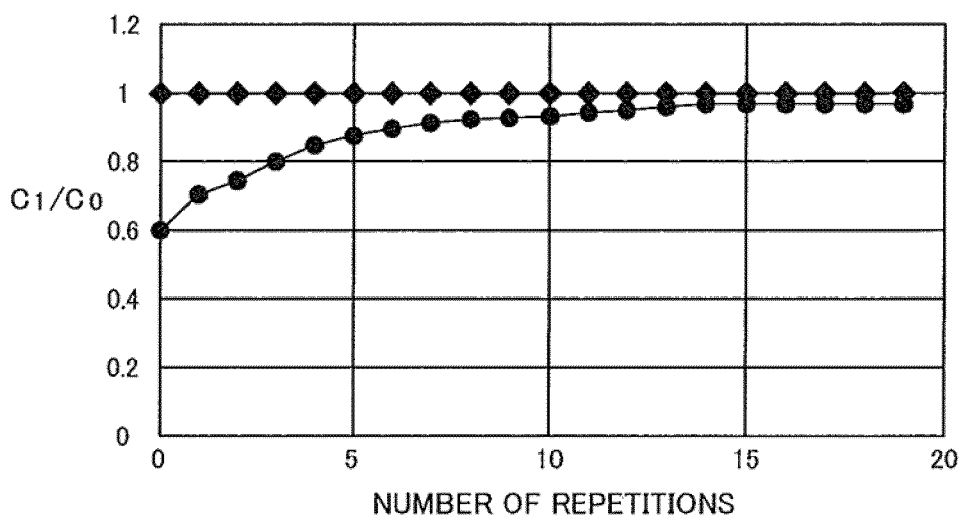
FIG. 13B is a line graph illustrating the comparison between eigenmode transmission and transmission using the antenna weighting coefficient matrix W calculated by the method of calculating the antenna weighting coefficient matrix W according to the third embodiment of the present invention.
Figure 13C:
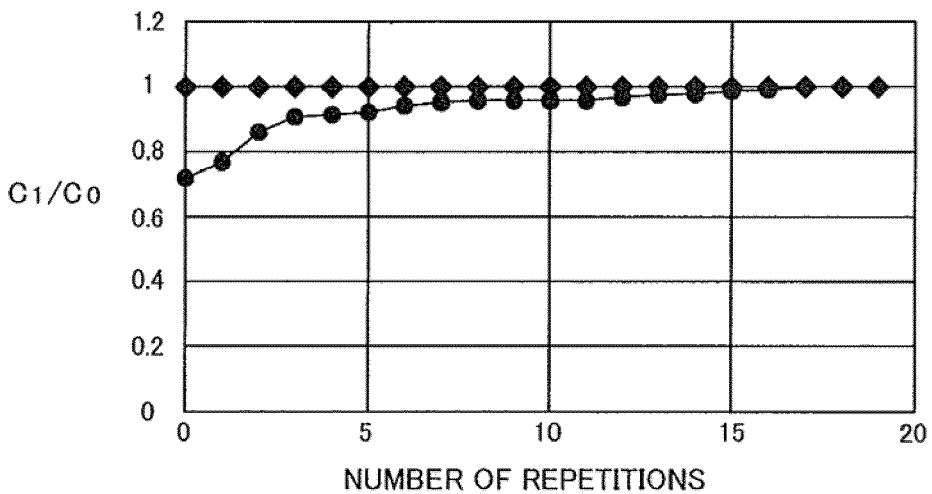
FIG. 13C is a line graph illustrating the comparison between eigenmode transmission and transmission using the antenna weighting coefficient matrix W calculated by the method of calculating the antenna weighting coefficient matrix W according to the third embodiment of the present invention.
Figure 13D:
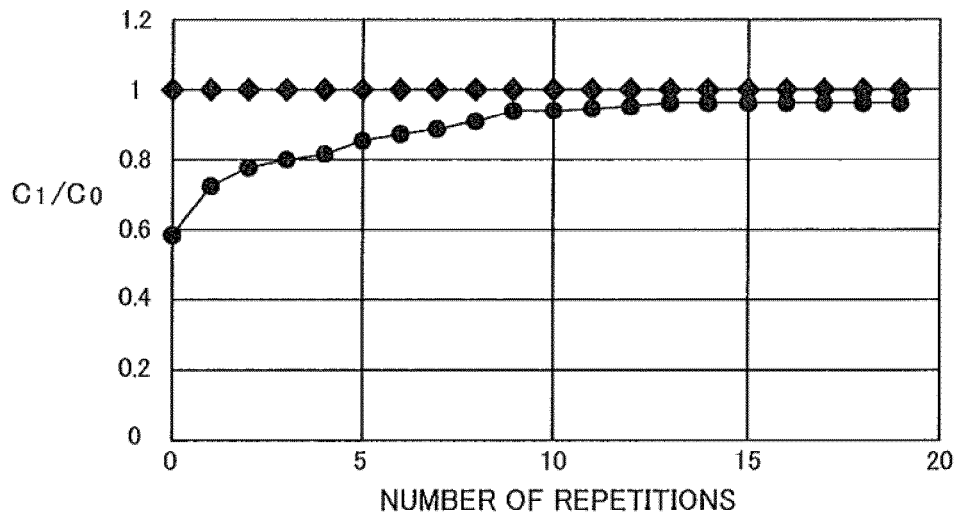
FIG. 13D is a line graph illustrating the comparison between eigenmode transmission and transmission using the antenna weighting coefficient matrix W calculated by the method of calculating the antenna weighting coefficient matrix W according to the third embodiment of the present invention.
Figure 13E:
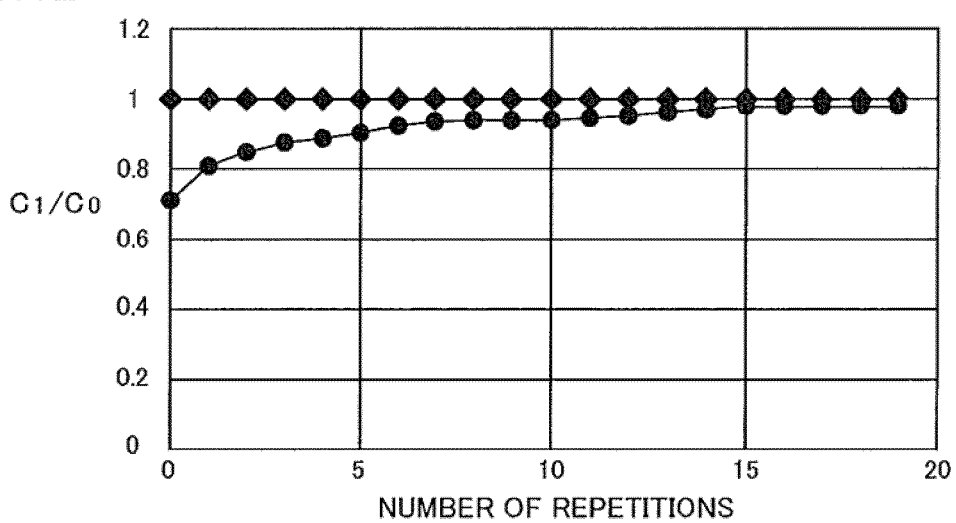
FIG. 13E is a line graph illustrating the comparison between eigenmode transmission and transmission using the antenna weighting coefficient matrix W calculated by the method of calculating the antenna weighting coefficient matrix W according to the third embodiment of the present invention.
Figure 13F:
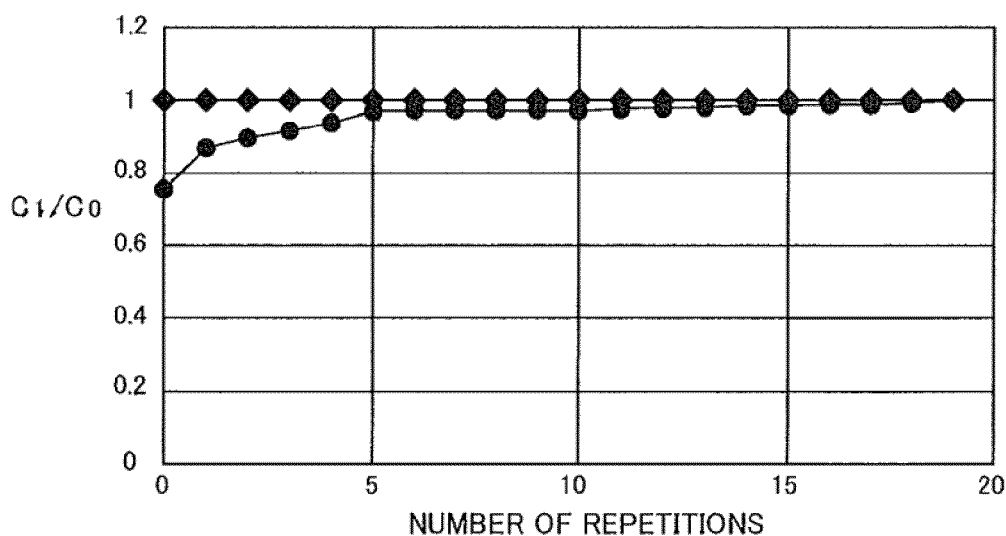
FIG. 13F is a line graph illustrating the comparison between eigenmode transmission and transmission using the antenna weighting coefficient matrix W calculated by the method of calculating the antenna weighting coefficient matrix W according to the third embodiment of the present invention.

FIG. 13A is a line graph illustrating characteristics when (M×N×S) is (3×3×2), FIG. 13B is a line graph illustrating characteristics when (M×N×S) is (4×4×2), and FIG. 13C is a line graph illustrating characteristics when (M×N×S) is (4×4×3). In addition, FIG. 13D is a line graph illustrating characteristics when (M×N×S) is (5×5×2), FIG. 13E is a line graph illustrating characteristics when (M×N×S) is (5×5×3), and FIG. 13F is a line graph illustrating characteristics when (M×N×S) is (5×5×4).

As can be seen from six line graphs shown in FIGS. 13A to 13F, the ratio of the communication capacities converges on 1. That is, the communication capacity when the antenna weighting coefficient matrix W is used converges on the communication capacity during the eigenmode transmission.

Next, the operation of the selecting circuit 212 selecting S rows from the channel matrix H by the patterns 1 to 5 described in the first embodiment of the present invention in order to improve the convergence speed of the communication capacity which will be described.

FIGS. 14A to 14F are line graphs illustrating the convergence of communication capacity when the antenna weighting coefficient matrix W is calculated using the sub-channel matrix $H_S$ selected by the patterns 1 to 5. In FIGS. 14A to 14F show the antenna weighting coefficient matrix W calculated using the sub-channel matrix $H_S$ that is selected by the patterns 1 to 5 when (M×N×S) is (3×3×2).

Figure 14A:
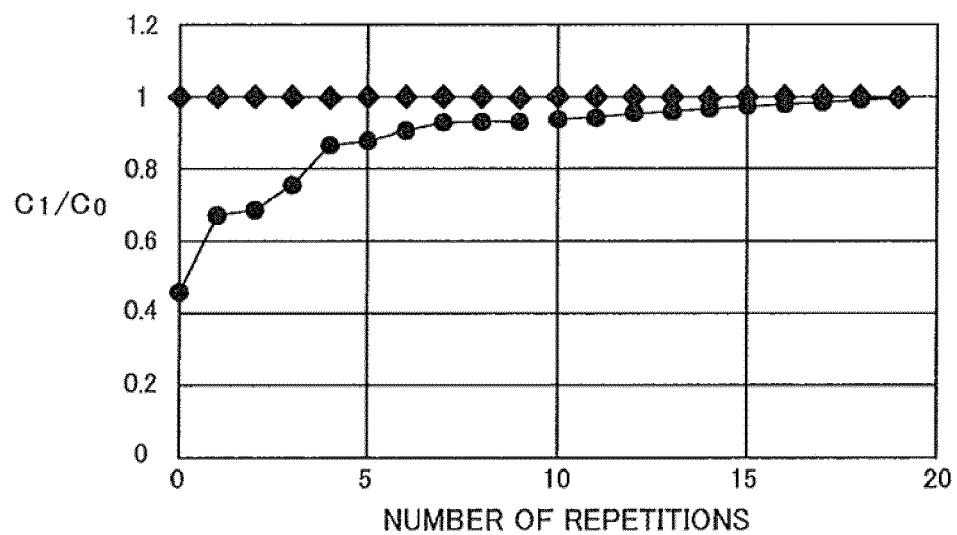
FIG. 14A is a bar graph illustrating the convergence of communication capacity.
Figure 14B:
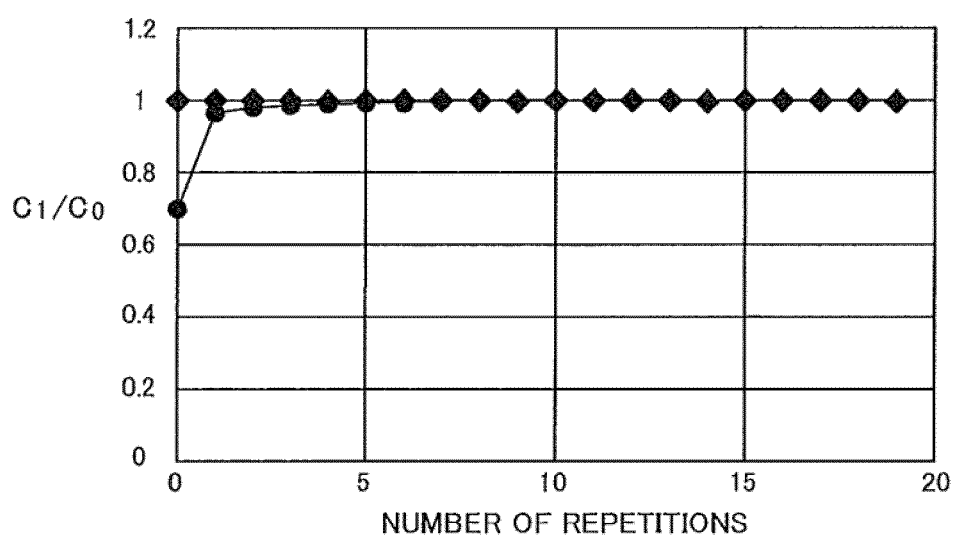
FIG. 14B is a bar graph illustrating the convergence of communication capacity.
Figure 14C:
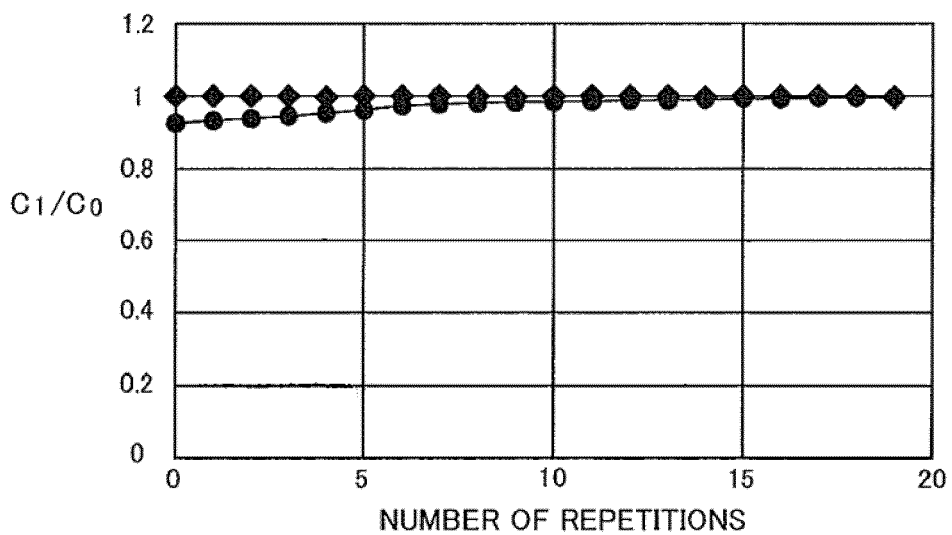
FIG. 14C is a bar graph illustrating the convergence of communication capacity.
Figure 14D:
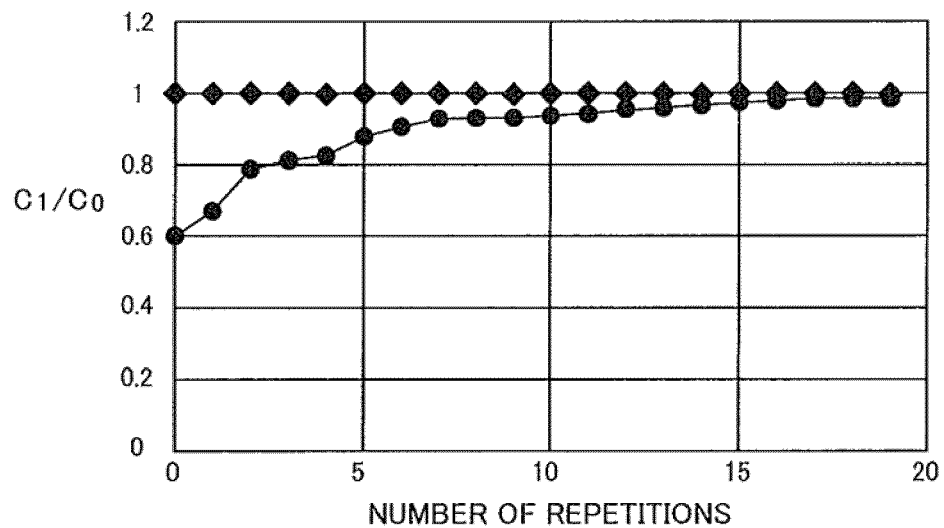
FIG. 14D is a bar graph illustrating the convergence of communication capacity.
Figure 14E:
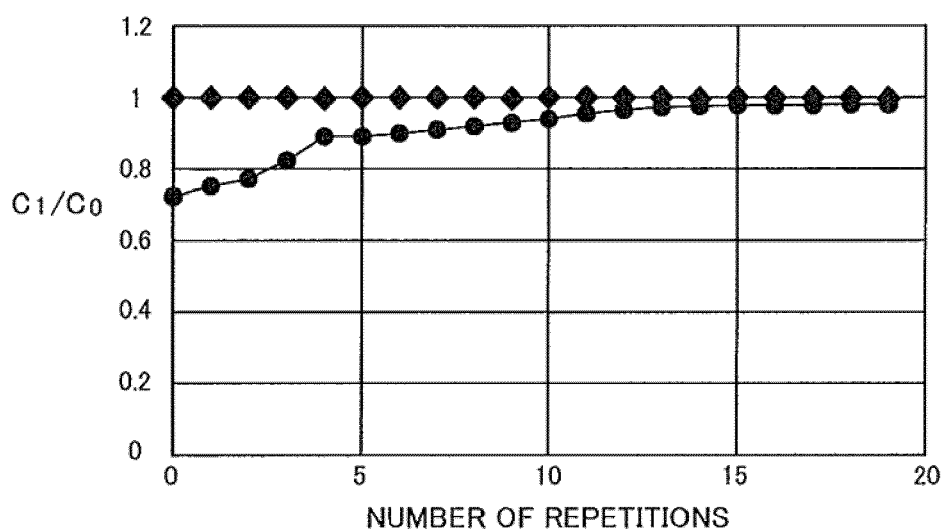
FIG. 14E is a bar graph illustrating the convergence of communication capacity.
Figure 14F:
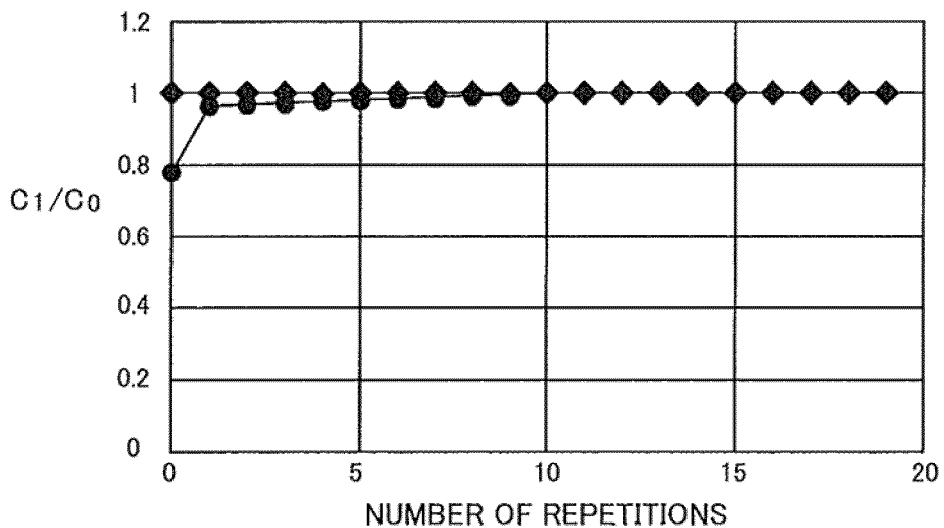
FIG. 14F is a bar graph illustrating the convergence of communication capacity.

FIG. 14A is the same as FIG. 13A, FIG. 14B is a line graph illustrating characteristics when the sub-channel matrix $H_S$ selected by the pattern 1 is used, and FIG. 14C is a line graph illustrating characteristics when the sub-channel matrix $H_S$ selected by the pattern 2 is used. In FIG. 14D is a line graph illustrating characteristics when the sub-channel matrix $H_S$ selected by the pattern 3 is used, FIG. 14E is a line graph illustrating characteristics when the sub-channel matrix $H_S$ selected by the pattern 4 is used, and FIG. 14F is a line graph illustrating characteristics when the sub-channel matrix $H_S$ selected by the pattern 5 is used.

As can be seen from the graphs shown in FIGS. 14A to 14F, in all the patterns 1 to 5, convergence characteristics are improved, as compared to when S rows are appropriately selected from N rows of the channel matrix H of N rows and M columns to generate the sub-channel matrix $H_S$. The improvement in the convergence characteristics makes it possible to shorten a calculation time.

In this embodiment, (M×N×S) is (3×3×2), but other combinations of M, N, and S may be used. In this case, the convergence characteristics are also improved, as compared to when S rows are appropriately selected from N rows of the channel matrix H of N rows and M columns to generate the sub-channel matrix $H_S$.

The method of calculating the antenna weighting coefficient matrix W according to the third embodiment of the present invention has been described with reference to FIG. 12. As described above, according to the third embodiment of the present invention, when the maximum value of the number of data streams to be subjected to a transmission beam-forming process is smaller than the number of antennas, the antenna weighting coefficient matrix W is calculated based on the channel matrix H and the sub-channel matrix $H_S$ obtained by extracting the number of rows corresponding to the maximum value of the number of data streams from the channel matrix H.

As such, since the antenna weighting coefficient matrix W is calculated based on the channel matrix H and the sub-channel matrix $H_S$, the rank of the matrix used for calculation is reduced, and it is possible to reduce the amount of calculation of SVD, which is a representative example of the matrix computation, while maintaining characteristics at a certain level. In addition, it is possible to prevent deterioration of characteristics and reduce the overall size of a weighting coefficient matrix calculating circuit. When this wireless communication system is actually mounted to a communication apparatus, the amount of computation depends on the size of a circuit and a computation time. Therefore, it is possible to reduce the size of a circuit and shorten the computation time.

When the sub-channel matrix $H_S$ is generated, it is possible to improve convergence characteristics while minimizing an increase in the amount of computation by giving row selection conditions, similar to the first and second embodiments of the present invention.

(Fourth Embodiment)

In the third embodiment of the present invention, after the temporary antenna weighting coefficient matrix $W_T$ is calculated from the sub-channel matrix $H_S$, the reverse antenna weighting coefficient matrix $W_R$ is obtained by the transposition of the matrix, and the antenna weighting coefficient matrix W is obtained by the transposition of the matrix. In the fourth embodiment of the present invention, similar to the third embodiment of the present invention, the antenna weighting coefficient matrix W is calculated by matrix transposition, which will be described below.

Figure 15:
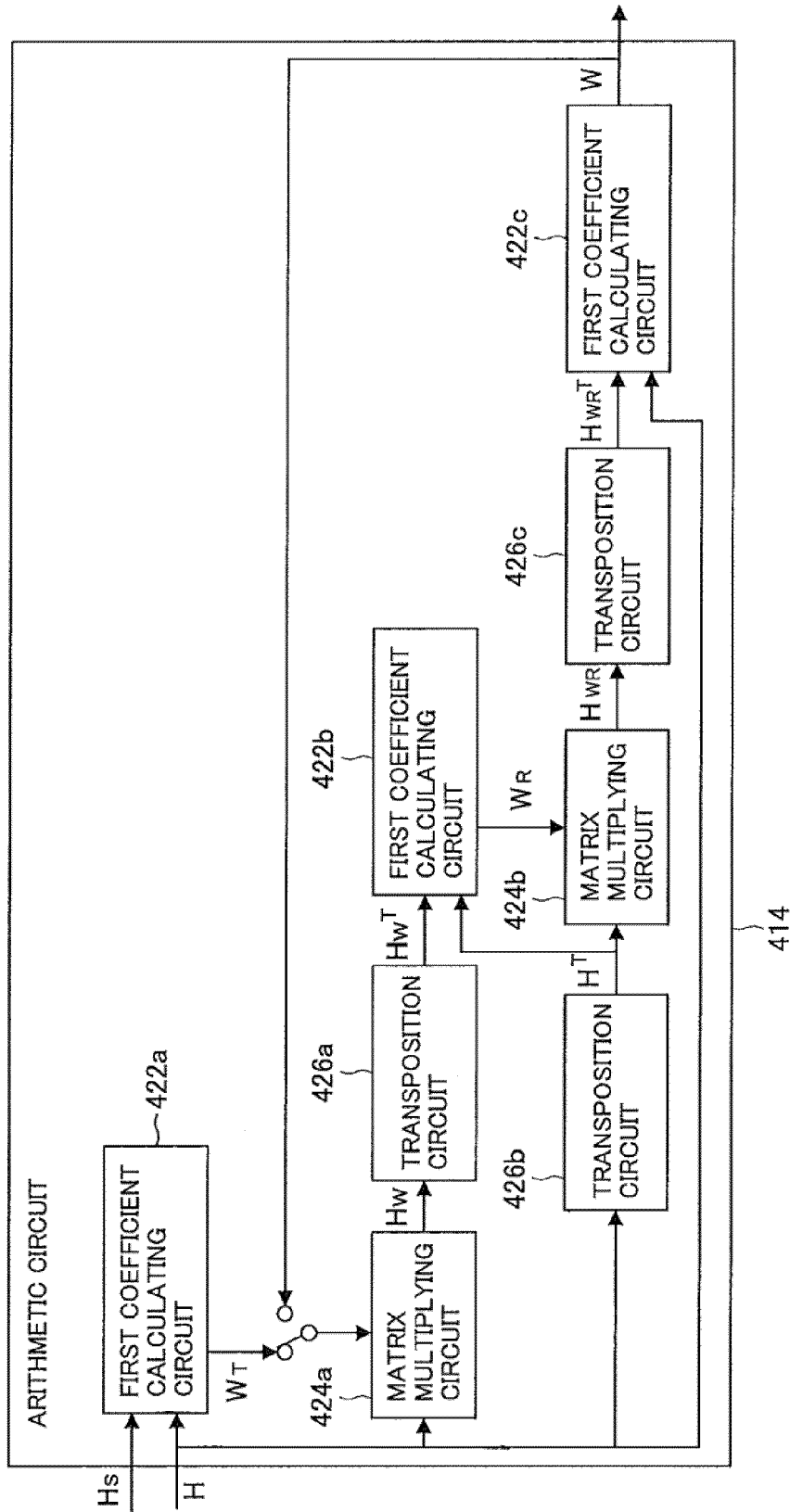
FIG. 15 is a diagram illustrating the structure of an arithmetic circuit 414 according to a fourth embodiment of the present invention.

FIG. 15 is a diagram illustrating the structure of an arithmetic circuit 414 according to the fourth embodiment of the present invention. Hereinafter, the structure of the arithmetic circuit 414 according to the fourth embodiment of the present invention will be described with reference to FIG. 15.

The arithmetic circuit 414 shown in FIG. 15 replaces the arithmetic circuit 214 according to the second embodiment of the present invention shown in FIG. 6. That is, the arithmetic circuit 414 receives the sub-channel matrix $H_S$ selected by the selecting circuit 212 and the channel matrix H estimated by the channel estimating circuit 102, and outputs the antenna weighting coefficient matrix W for a transmission beam-forming.

As shown in FIG. 15, the arithmetic circuit 414 according to the fourth embodiment of the present invention includes first coefficient calculating circuits 422a, 422b, and 422c, matrix multiplying circuits 424a and 424b, and transposition circuits 426a, 426b, and 426c.

The first coefficient calculating circuit 422a receives the channel matrix H and the sub-channel matrix $H_S$, and calculates the temporary antenna weighting coefficient matrix $W_T$ based on the channel matrix H and the sub-channel matrix $H_S$. The structure of the first coefficient calculating circuit 422a will be described below. The first coefficient calculating circuit 422a outputs the calculated temporary antenna weighting coefficient matrix $W_T$ to the matrix multiplying circuit 424a.

The matrix multiplying circuit 424a is for multiplying matrices. The matrix multiplying circuit 424a according to this embodiment multiplies the channel matrix H estimated by the channel estimating circuit 102 by the temporary antenna weighting coefficient matrix $W_T$ calculated by the first coefficient calculating circuit 422a to generate a weighted channel matrix $H_W$ ($H_W = HW_T$). In this case, $H_W$ indicates a matrix of M rows and S columns. The weighted channel matrix $H_W$ generated by the matrix multiplying circuit 424a is output to the transposition circuit 426a.

The transposition circuit 426a is for transposing a matrix. The transposition circuit 426a according to this embodiment receives the weighted channel matrix $H_W$ generated by the matrix multiplying circuit 424a, transposes the weighted channel matrix $H_W$, and outputs a transposed weighted channel matrix $H_W^T$. The transposed weighted channel matrix $H_W^T$ is input to the first coefficient calculating circuit 422b.

The transposition circuit 426b is for transposing a matrix. The transposition circuit 426b according to this embodiment receives the channel matrix H estimated by the channel estimating circuit 102, transposes the channel matrix H, and outputs a transposed channel matrix $H^T$. The transposed channel matrix $H^T$ is input to the first coefficient calculating circuit 422b and the matrix multiplying circuit 424b.

The first coefficient calculating circuit 422b calculates a reverse antenna weighting coefficient matrix $W_R$ based on the transposed weighted channel matrix $H_W^T$ output from the transposition circuit 426a and the transposed channel matrix $H^T$ output from the transposition circuit 426b. The first coefficient calculating circuit 422b outputs the calculated reverse antenna weighting coefficient matrix $W_R$ to the matrix multiplying circuit 424b.

The matrix multiplying circuit 424b is for multiplying matrices. The matrix multiplying circuit 424b according to this embodiment multiplies the reverse antenna weighting coefficient matrix $W_R$ output from the first coefficient calculating circuit 422b by the transposed channel matrix $H^T$ output from the transposition circuit 426b to generate a reverse weighted channel matrix $H_{WR}$ ($H_{WR} = H^T W_R$). In the case, the reverse weighted channel matrix $H_{WR}$ includes N rows and S columns. The reverse weighted channel matrix $H_{WR}$ generated by the matrix multiplying circuit 424b is input to the transposition circuit 426c.

The transposition circuit 426c is for transposing a matrix. The transposition circuit 426c according to this embodiment transposes the reverse weighted channel matrix $H_{WR}$ generated by the matrix multiplying circuit 424b to generate a transposed reverse weighted channel matrix $H_{WR}^T$. The transposed reverse weighted channel matrix $H_{WR}{}^T$ is input to the first coefficient calculating circuit 422c.

The first coefficient calculating circuit 422c receives the channel matrix H estimated by the channel estimating circuit 102 and the transposed reverse weighted channel matrix $H_{WR}{}^T$ output from the transposition circuit 426c, and generates the antenna weighting coefficient matrix W based on the channel matrix H and the transposed reverse weighted channel matrix $H_{WR}{}^T$. The first coefficient calculating circuit 422c outputs the calculated antenna weighting coefficient matrix W to the weighting circuit 110.

The antenna weighting coefficient matrix W output from the first coefficient calculating circuit 422c may be input to the matrix multiplying circuit 424a again. It is possible to improve communication characteristics by repeatedly performing a computing process using the antenna weighting coefficient matrix W output from the first coefficient calculating circuit 422c.

The structure of the arithmetic circuit 414 according to the fourth embodiment of the present invention has been described above with reference to FIG. 15. Next, the structure of the first coefficient calculating circuit according to the fourth embodiment of the present invention will be described.

Figure 16:
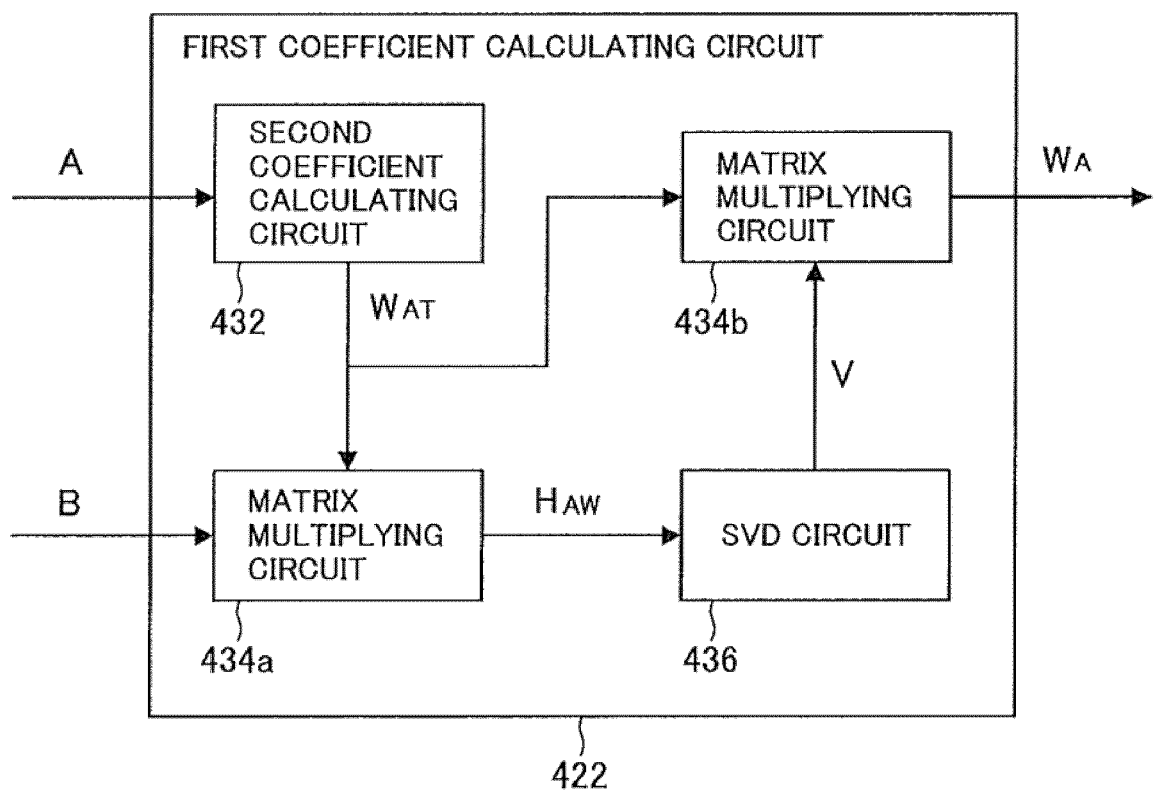
FIG. 16 is a diagram illustrating the structure of a first coefficient calculating circuit 422a according to the fourth embodiment of the present invention.

FIG. 16 is a diagram illustrating the structure of the first coefficient calculating circuit 422a according to the fourth embodiment of the present invention. Hereinafter, the structure of the first coefficient calculating circuit 422a according to the fourth embodiment of the present invention will be described with reference to FIG. 16.

The first coefficient calculating circuit 422a receives a sub-channel matrix A and a channel matrix B, and calculates an antenna weighting coefficient matrix $W_A$. In the arithmetic circuit 414 shown in FIG. 15, three first coefficient calculating circuits are used. The relationship among A, B, and $W_A$ in the first coefficient calculating circuit 422a is ($H_S$, H, $W_T$), the relationship among A, B, and $W_A$ in the first coefficient calculating circuit 422b is ($H_W{}^T$, $H^T$, $W_R$), and the relationship among A, B, and $W_A$ in the first coefficient calculating circuit 422c is ($H_{WR}{}^T$, H, W). In this embodiment, only the first coefficient calculating circuit 422a is described, but the first coefficient calculating circuits 422b and 422c have the same structure as the first coefficient calculating circuit 422a.

As shown in FIG. 16, the first coefficient calculating circuit 422a according to the fourth embodiment of the present invention includes a second coefficient calculating circuit 432, matrix multiplying circuits 434a and 434b, and a SVD circuit 436. The structure of the first coefficient calculating circuit 422a shown in FIG. 16 is the same as that of the arithmetic circuit 214 according to the second embodiment of the present invention shown in FIG. 7.

The second coefficient calculating circuit 432 calculates a temporary antenna weighting coefficient matrix $W_{AT}$ based on the sub-channel matrix A (in this embodiment, the sub-channel matrix $H_S$). For example, the second coefficient calculating circuit 432 can use singular value decomposition to calculate the temporary antenna weighting coefficient matrix $W_{AT}$. When singular value decomposition is performed on the sub-channel matrix A, the following Expression 15 is obtained.

$$A = UDV^H \qquad \text{(Expression 15)}$$

When the temporary antenna weighting coefficient matrix $W_{AT}$ is calculated by singular value decomposition, the second coefficient calculating circuit 432 uses the matrix (right singular matrix) V of Expression 15 as the temporary antenna weighting coefficient matrix $W_{AT}$. The second coefficient calculating circuit 432 outputs the calculated temporary antenna weighting coefficient matrix $W_{AT}$ to the matrix multiplying circuits 434a and 434b.

The matrix multiplying circuit 434a is for multiplying matrices. The matrix multiplying circuit 434a according to this embodiment multiplies the channel matrix B (in this embodiment, the channel matrix H) by the temporary antenna weighting coefficient matrix $W_{AT}$ calculated by the second coefficient calculating circuit 432 to generate a weighted channel matrix $H_{AW}$ ($H_{AW}=BW_{AT}$). In this case, $H_{AW}$ indicates a matrix of M rows and S columns. The weighted channel matrix $H_{AW}$ generated by the matrix multiplying circuit 434a is output to the SVD circuit 436.

The SVD circuit 436 is for performing singular value decomposition. In this embodiment, the SVD circuit 436 receives the weighted channel matrix $H_{AW}$ generated by the matrix multiplying circuit 434a and performs the singular value decomposition on the weighted channel matrix $H_{AW}$. When the singular value decomposition is performed on the weighted channel matrix $H_{AW}$, the following Expression 16 is obtained.

$$H_{AW} = UDV^H \qquad \text{(Expression 16)}$$

The matrix (right singular matrix) V obtained by the Expression 16 is output to the matrix multiplying circuit 434b.

The matrix multiplying circuit 434b is for multiplying matrices. The matrix multiplying circuit 434b according to this embodiment multiplies the temporary antenna weighting coefficient matrix $W_{AT}$ calculated by the second coefficient calculating circuit 432 by the matrix V calculated by the SVD circuit 436 to generate the antenna weighting coefficient matrix $W_A$ ($W_A=W_{AT}V$). In this embodiment, the antenna weighting coefficient matrix $W_A$ is the temporary antenna weighting coefficient matrix $W_T$. The rows that are not used in the calculation of the temporary antenna weighting coefficient matrix $W_{AT}$ (that is, the rows of the channel matrix B that are not included in the sub-channel matrix A) are used to calculate the antenna weighting coefficient matrix $W_A$. Therefore, it is possible to improve characteristics.

The antenna weighting coefficient matrix $W_A$ generated by the matrix multiplying circuit 434b is the reverse antenna weighting coefficient matrix $W_R$ in the first coefficient calculating circuit 422b, and is the antenna weighting coefficient matrix W in the first coefficient calculating circuit 422c.

The structure of the first coefficient calculating circuit 422a according to the fourth embodiment of the present invention has been described with reference to FIG. 16. Next, a method of calculating the antenna weighting coefficient matrix W according to the fourth embodiment of the present invention will be described.

Figure 17:
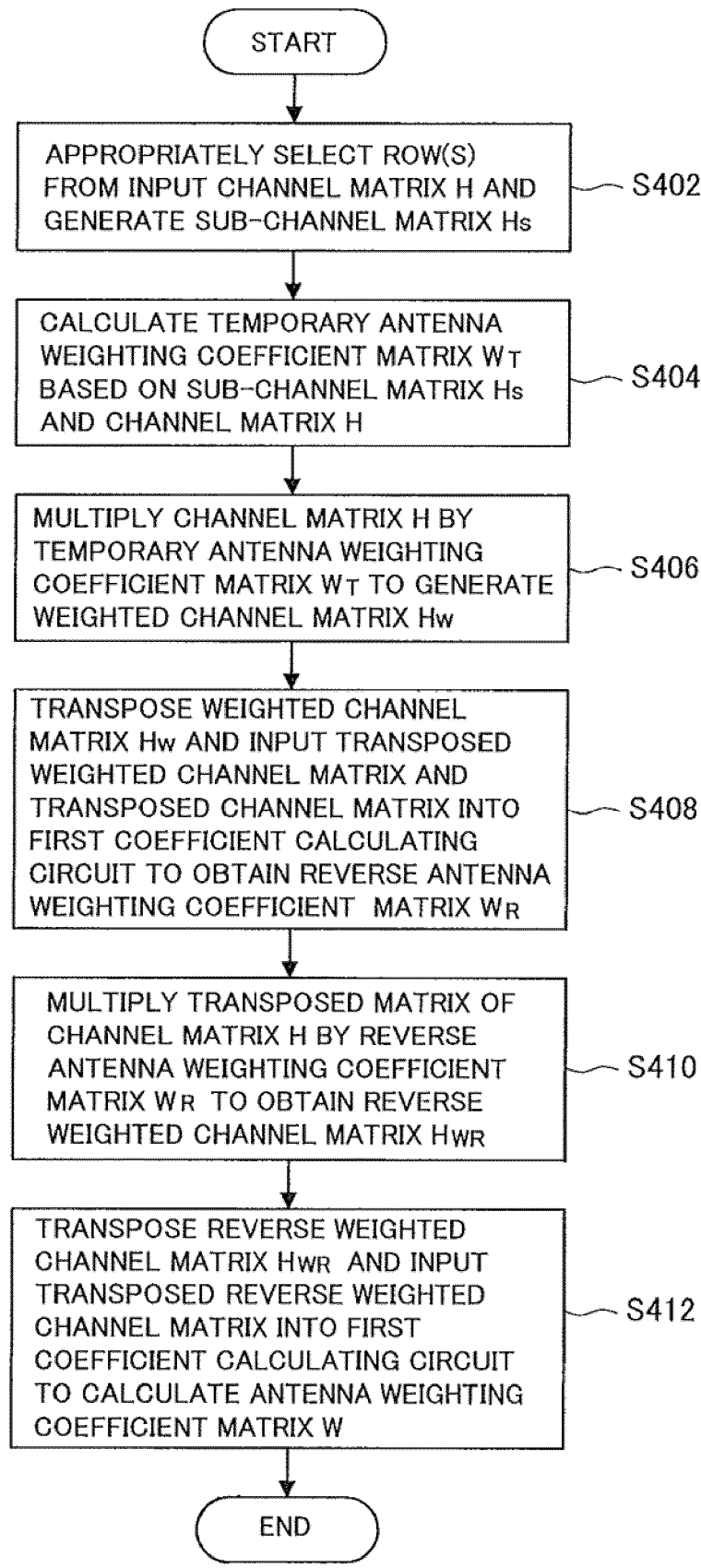
FIG. 17 is a flowchart illustrating a method of calculating an antenna weighting coefficient matrix W according to the fourth embodiment of the present invention.

FIG. 17 is a flowchart illustrating the method of calculating the antenna weighting coefficient matrix W according to the fourth embodiment of the present invention. Hereinafter, the method of calculating the antenna weighting coefficient matrix W according to the fourth embodiment of the present invention will be described with reference to FIG. 17.

When the channel matrix H of N rows and M columns is input to the weighting coefficient matrix calculating circuit 204, the selecting circuit 212 appropriately selects S rows from the channel matrix H and generates the sub-channel matrix $H_S$ (Step S402). When the selecting circuit 212 generates the sub-channel matrix $H_S$, the first coefficient calculating circuit 422a calculates the temporary antenna weighting coefficient matrix $W_T$ based on the generated sub-channel matrix $H_S$ and the channel matrix H (Step S404). As described above, for example, the first coefficient calculating circuit 422a can use singular value decomposition to calculate the temporary antenna weighting coefficient matrix $W_T$.

When the temporary antenna weighting coefficient matrix $W_T$ is completely generated in Step S404, the matrix multiplying circuit 424a multiplies the channel matrix H by the temporary antenna weighting coefficient matrix $W_T$ to generate the weighted channel matrix $H_W$ (Step S406).

When the weighted channel matrix $H_W$ is generated in Step S406, the transposition circuit 426a transposes the weighted channel matrix $H_W$. Then, the first coefficient calculating circuit 422b receives the transposed weighted channel matrix $H_W^T$ and the transposed matrix $H^T$ of the channel matrix H, and calculates the reverse antenna weighting coefficient matrix $W_R$ using the transposed weighted channel matrix $H_W^T$ and the transposed matrix $H^T$ of the channel matrix H (Step S408).

When the reverse antenna weighting coefficient matrix $W_R$ is generated in Step S408, the matrix multiplying circuit 424b multiplies the transposed channel matrix $H^T$ transposed from the channel matrix H by the transposition circuit 426b by the reverse antenna weighting coefficient matrix $W_R$. A reverse weighted channel matrix $H_{WR}$ is obtained by the multiplication of the transposed channel matrix $H^T$ and the reverse antenna weighting coefficient matrix $W_R$ (Step S410).

When the reverse weighted channel matrix $H_{WR}$ is obtained in Step S410, the transposition circuit 426c transposes the reverse weighted channel matrix $H_{WR}$ to obtain a transposed reverse weighted channel matrix $H_{WR}^T$. Then, the first coefficient calculating circuit 422c receives the transposed reverse weighted channel matrix $H_{WR}^T$ and the channel matrix H and calculates the antenna weighting coefficient matrix W (Step 412).

In this way, finally, the matrix is transposed to obtain the antenna weighting coefficient matrix W. Therefore, it is possible to obtain the same effects as those when the arithmetic circuit 414 performs a two-way beam-forming process.

From the relationship of S<min(M, N), since the rank of the matrix subjected to singular value decomposition is less than that in eigenmode transmission, the amount of calculation is reduced by a value corresponding to the reduction in the rank of the matrix. In addition, the amount of calculation is reduced by a value corresponding to a reduction in the number of elements of the matrix generated by the singular value decomposition. In addition, in order to improve communication characteristics, Step S406 to Step S412 may be repeatedly performed using the antenna weighting coefficient matrix W output from the first coefficient calculating circuit 422c. As described above, the total number of processes is increased, but the amount of calculation of the complicated singular value decomposition process is reduced. Therefore, it is possible to prevent an increase in the total amount of computation.

The first coefficient calculating circuits 422a, 422b, and 422c may be integrated with each other, the matrix multiplying circuits 424a, 424b, 424c, 434a, and 434b may be integrated with each other, and the transposition circuits 426a, 426b, and 426c may be integrated with each other according to conditions. In addition, the second coefficient calculating circuit 432 and the SVD circuit 436 may be integrated with each other.

FIGS. 18A to 18F are line graphs illustrating the comparison between eigenmode transmission and transmission using the antenna weighting coefficient matrix W calculated by the method of calculating the antenna weighting coefficient matrix W according to the fourth embodiment of the present invention. FIGS. 18A to 18F plot the maximum value and the minimum value of the ratios of communication capacity $C_1$ when S data streams are transmitted by the antenna weighting coefficient matrix W to communication capacity $C_0$ when S data streams are transmitted by eigenmode transmission ($C_1/C_0$) for 10000 samples. In the line graphs, the horizontal axis indicates the number of times Steps S406 to S412 are repeated. In addition, the number of repetitions is zero when the temporary antenna weighting matrix $W_T$ calculated by the first coefficient calculating circuit 422a is used instead of the antenna weighting coefficient matrix W.

In FIGS. 18A to 18F, when the number of transmitting antennas is M, the number of receiving antennas is N, and the number of rows selected from the channel matrix is S, the ratio of communication capacities is represented by six combinations of M, N, and S.

Here, the communication capacity C is calculated by the above-mentioned Expression 9. In addition, it is assumed that each element of the channel matrix H has a complex normal distribution with a mean of 0 and a variance of 1.

Figure 18A:
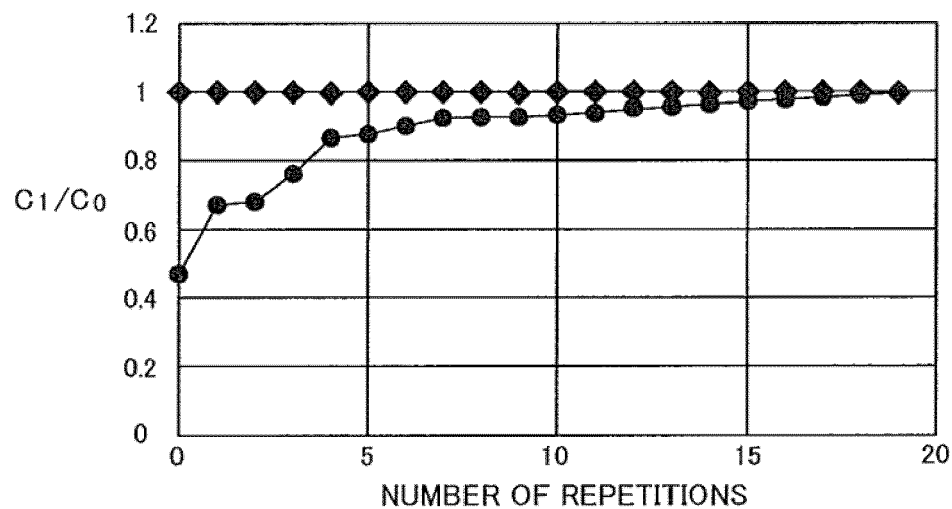
FIG. 18A is a line graph illustrating the comparison between eigenmode transmission and transmission using the antenna weighting coefficient matrix W calculated by the method of calculating the antenna weighting coefficient matrix W according to the fourth embodiment of the present invention.
Figure 18B:
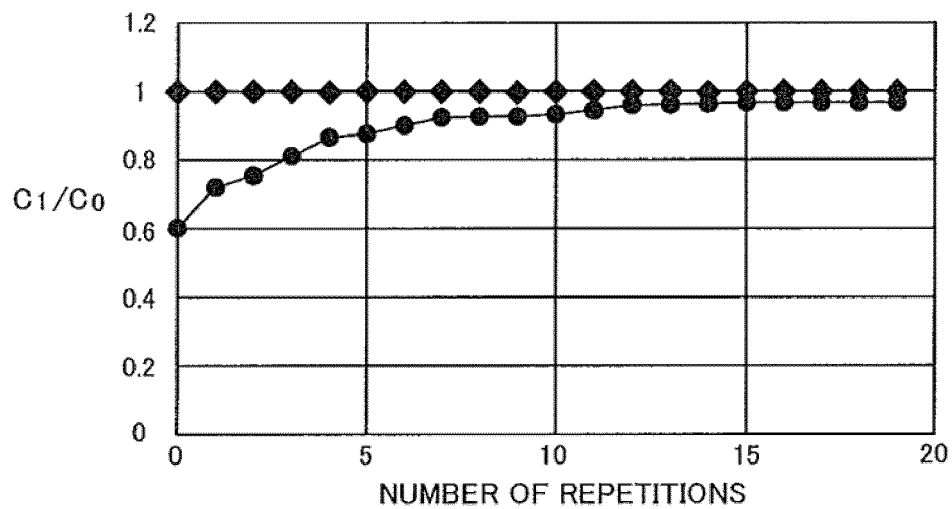
FIG. 18B is a line graph illustrating the comparison between eigenmode transmission and transmission using the antenna weighting coefficient matrix W calculated by the method of calculating the antenna weighting coefficient matrix W according to the fourth embodiment of the present invention.
Figure 18C:
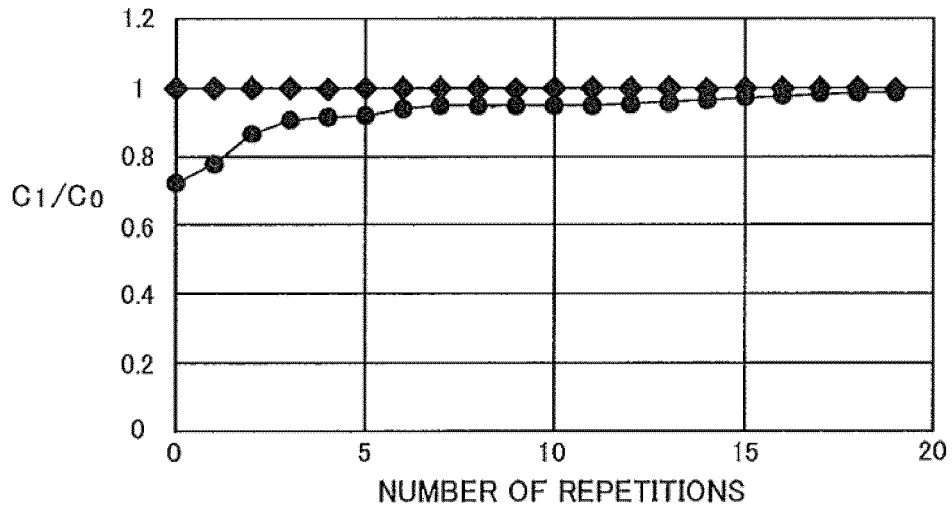
FIG. 18C is a line graph illustrating the comparison between eigenmode transmission and transmission using the antenna weighting coefficient matrix W calculated by the method of calculating the antenna weighting coefficient matrix W according to the fourth embodiment of the present invention.
Figure 18D:
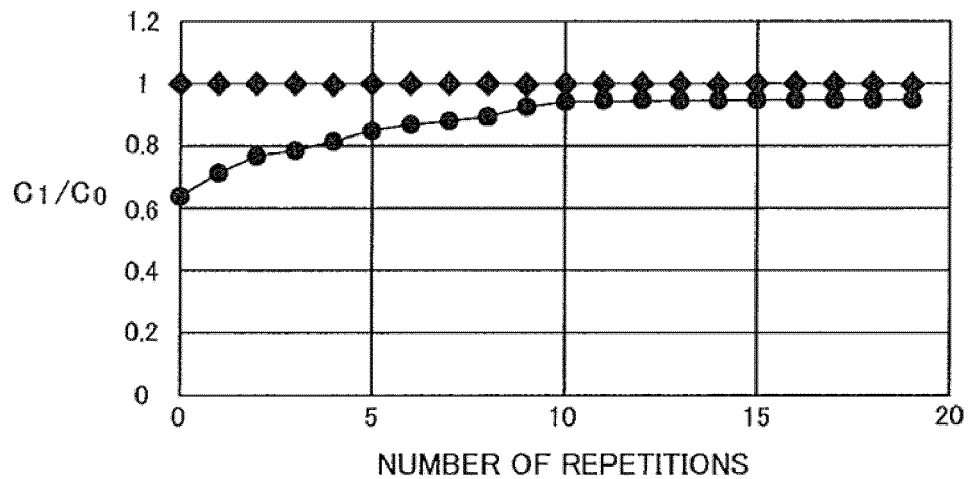
FIG. 18D is a line graph illustrating the comparison between eigenmode transmission and transmission using the antenna weighting coefficient matrix W calculated by the method of calculating the antenna weighting coefficient matrix W according to the fourth embodiment of the present invention.
Figure 18E:
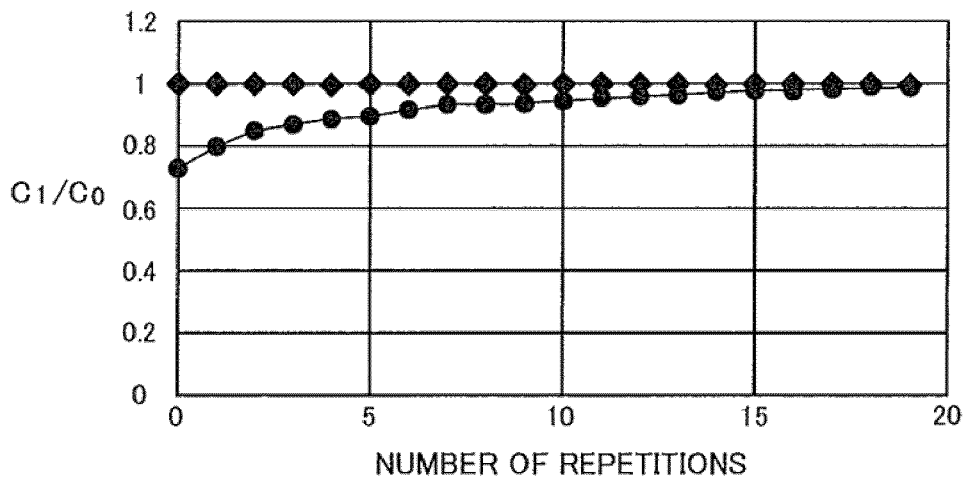
FIG. 18E is a line graph illustrating the comparison between eigenmode transmission and transmission using the antenna weighting coefficient matrix W calculated by the method of calculating the antenna weighting coefficient matrix W according to the fourth embodiment of the present invention.
Figure 18F:
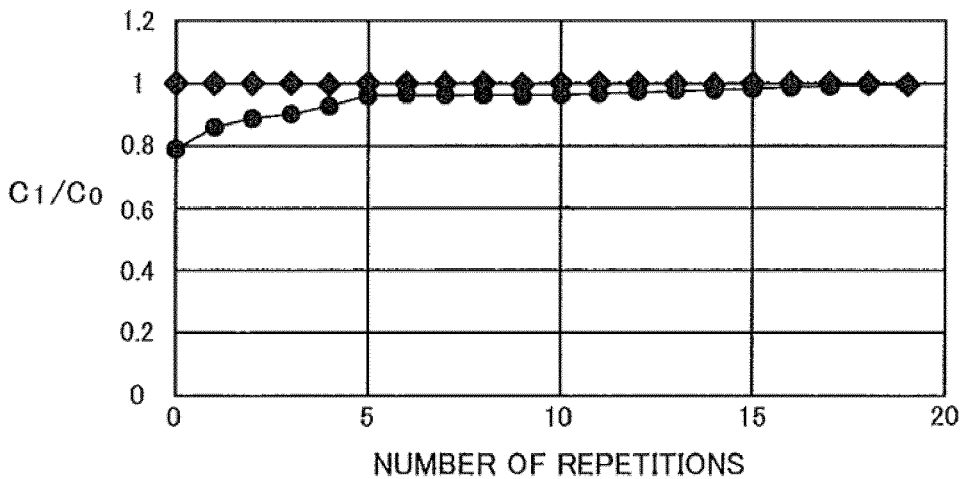
FIG. 18F is a line graph illustrating the comparison between eigenmode transmission and transmission using the antenna weighting coefficient matrix W calculated by the method of calculating the antenna weighting coefficient matrix W according to the fourth embodiment of the present invention.

FIG. 18A is a line graph illustrating characteristics when (M×N×S) is (3×3×2), FIG. 18B is a line graph illustrating characteristics when (M×N×S) is (4×4×2), and FIG. 18C is a line graph illustrating characteristics when (M×N×S) is (4×4×3). In addition, FIG. 18D is a line graph illustrating characteristics when (M×N×S) is (5×5×2), FIG. 18E is a line graph illustrating characteristics when (M×N×S) is (5×5×3), and FIG. 18F is a line graph illustrating characteristics when (M×N×S) is (5×5×4).

As can be seen from six line graphs shown in FIGS. 18A to 18F, similar to the line graphs according to the third embodiment of the present invention, in all the cases, the ratio of the communication capacities converges on 1. That is, the communication capacity when the antenna weighting coefficient matrix W is used converges on the communication capacity during the eigenmode transmission.

The method of calculating the antenna weighting coefficient matrix W according to the fourth embodiment of the present invention has been described above. Next, modifications of the fourth embodiment of the present invention will be described.

Figure 19:
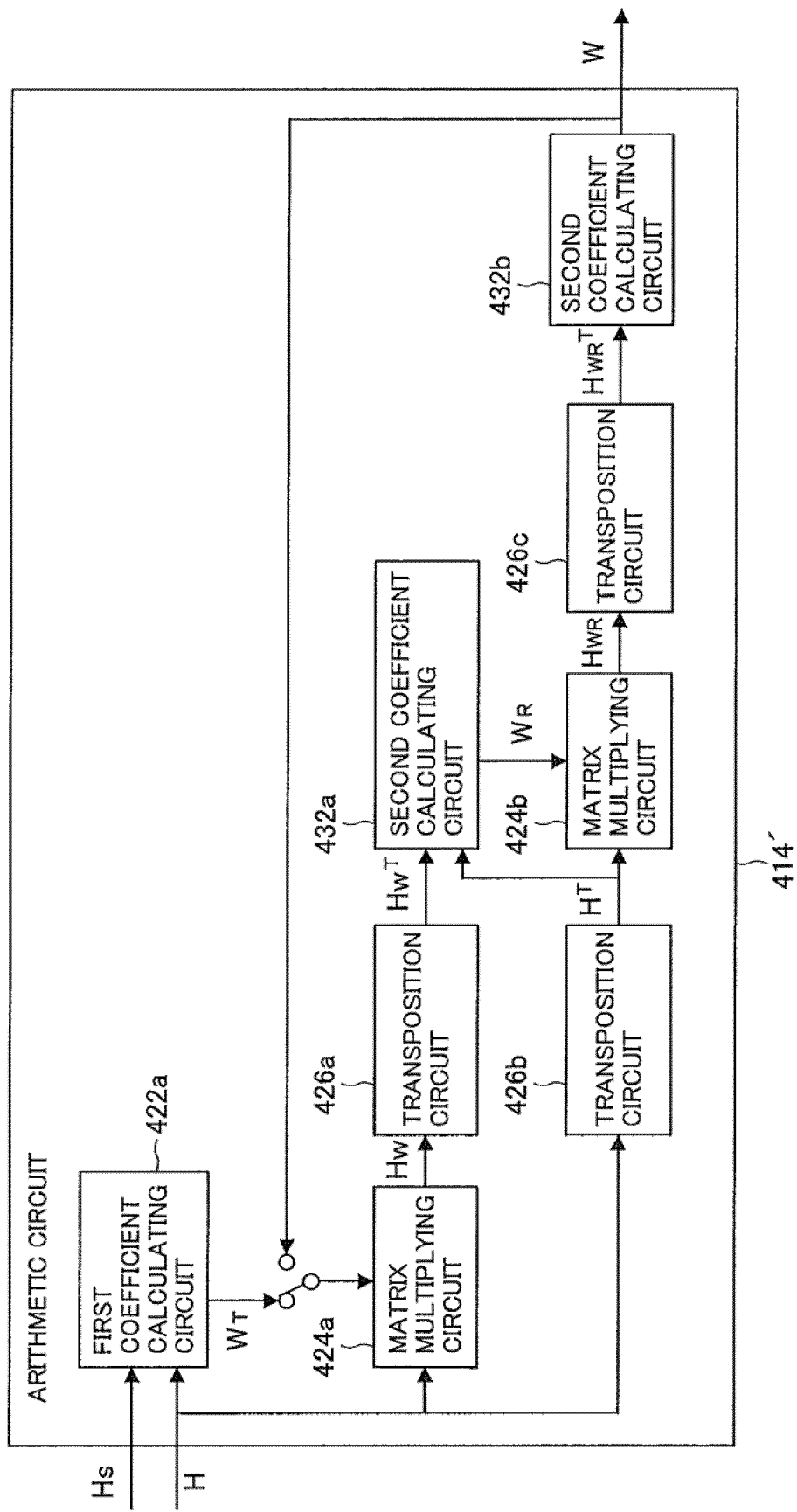
FIG. 19 is a diagram illustrating the structure of an arithmetic circuit 414' according to a modification of the fourth embodiment of the present invention.

FIG. 19 is a diagram illustrating the structure of an arithmetic circuit 414' according to a modification of the fourth embodiment of the present invention. Hereinafter, the structure of the arithmetic circuit 414' according to the modification of the fourth embodiment of the present invention will be described with reference to FIG. 19.

The arithmetic circuit 414' shown in FIG. 19 includes second coefficient calculating circuits 432a and 432b, instead of the first coefficient calculating circuits 422b and 422c of the arithmetic circuit 414 shown in FIG. 15. Even when the arithmetic circuit 414' has the above-mentioned structure, it is possible to obtain the same communication characteristics as those obtained by the arithmetic circuit 414 shown in FIG. 15.

Combinations of the first coefficient calculating circuit and the second coefficient calculating circuit are not limited to the above. For example, the second coefficient calculating circuit may be provided instead of the first coefficient calculating circuit 422b, and the second coefficient calculating circuit may be provided instead of the first coefficient calculating circuit 422c.

The structure of the arithmetic circuit 414' according to the modification of the fourth embodiment of the present invention has been described above. Next, the operation of the selecting circuit 212 selecting S rows from the channel matrix H by the patterns 1 to 5 described in the first embodiment of the present invention in order to improve the convergence speed of the communication capacity which will be described.

FIGS. 20A to 20F are line graphs illustrating the convergence of communication capacity when the antenna weighting coefficient matrix W is calculated using the sub-channel matrix $H_S$ selected by the patterns 1 to 5. In FIGS. 20A to 20F show the antenna weighting coefficient matrix W calculated using the sub-channel matrix $H_S$ that is selected by the patterns 1 to 5 when (M×N×S) is (3×3×2).

Figure 20A:
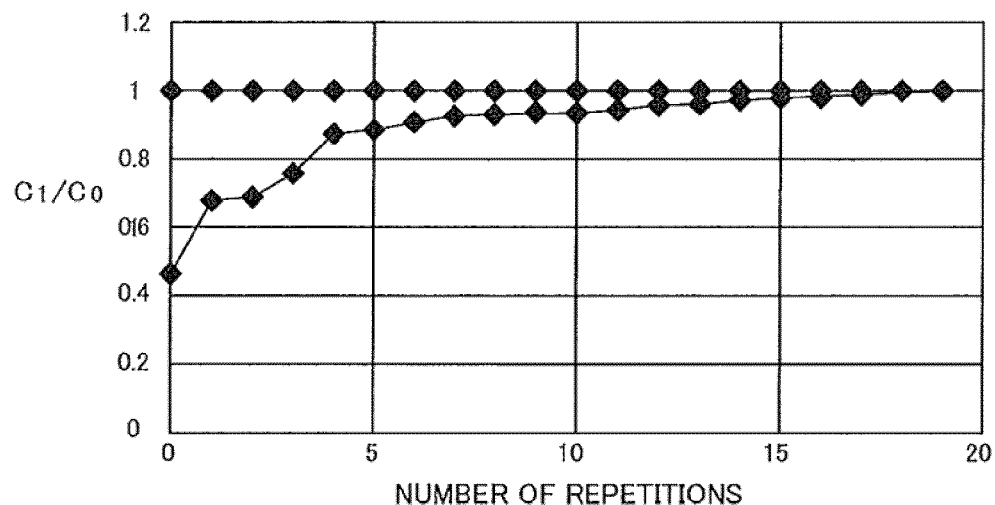
FIG. 20A is a bar graph illustrating the convergence of communication capacity.
Figure 20B:
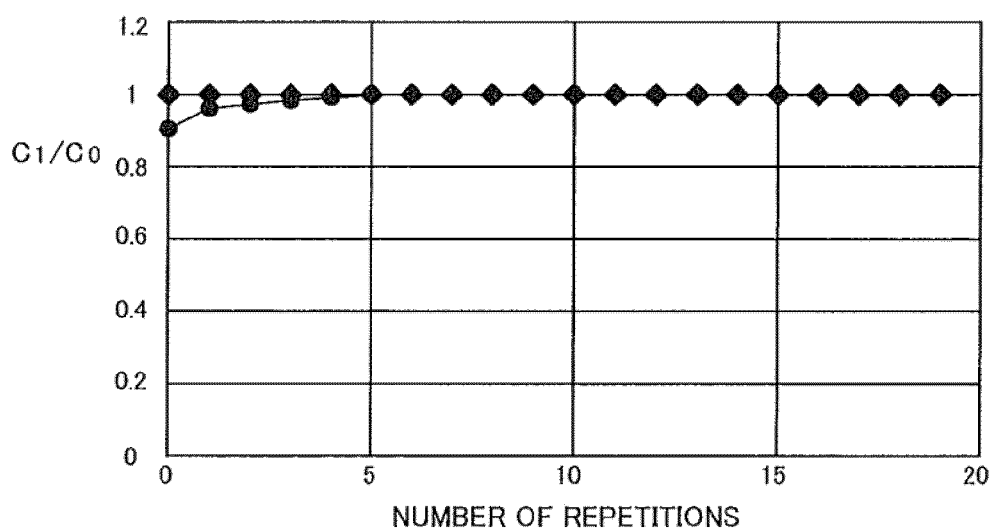
FIG. 20B is a bar graph illustrating the convergence of communication capacity.
Figure 20C:
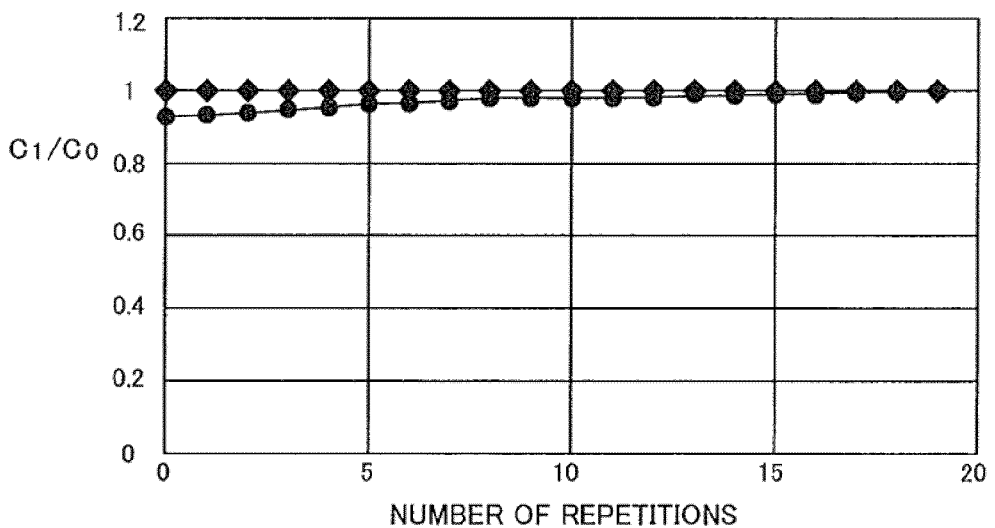
FIG. 20C is a bar graph illustrating the convergence of communication capacity.
Figure 20D:
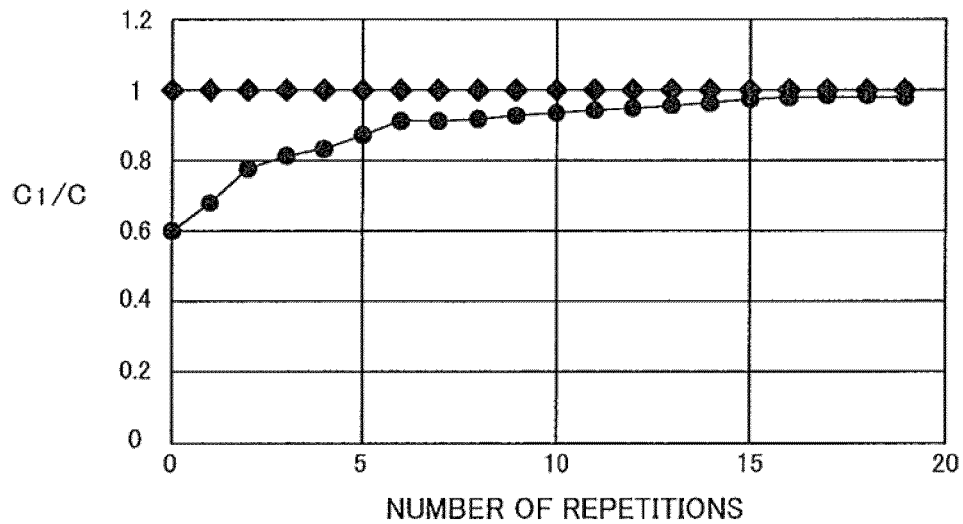
FIG. 20D is a bar graph illustrating the convergence of communication capacity.
Figure 20E:
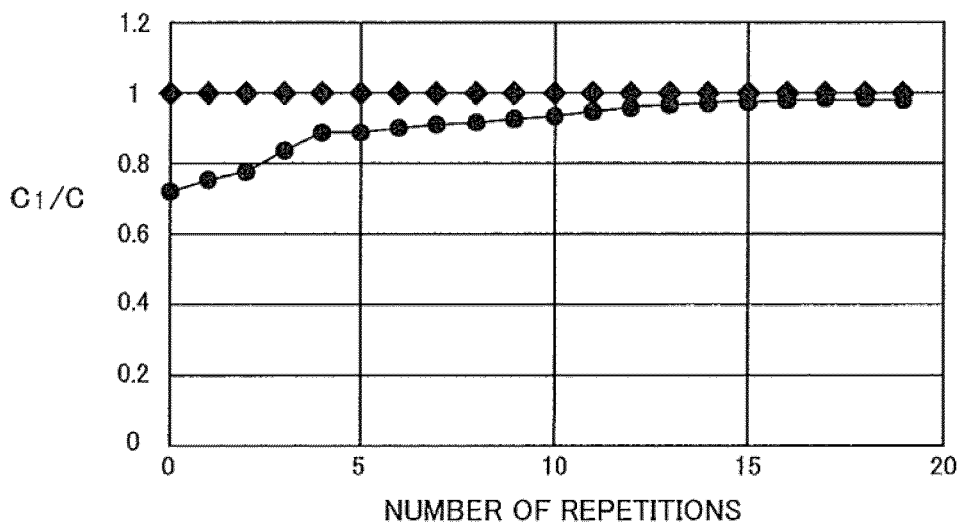
FIG. 20E is a bar graph illustrating the convergence of communication capacity.
Figure 20F:
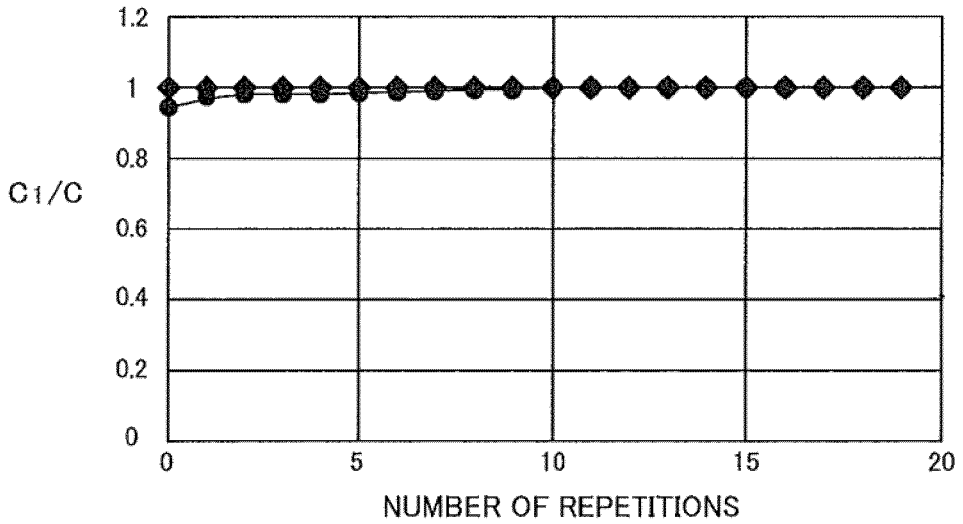
FIG. 20F is a bar graph illustrating the convergence of communication capacity.
Figure 21:
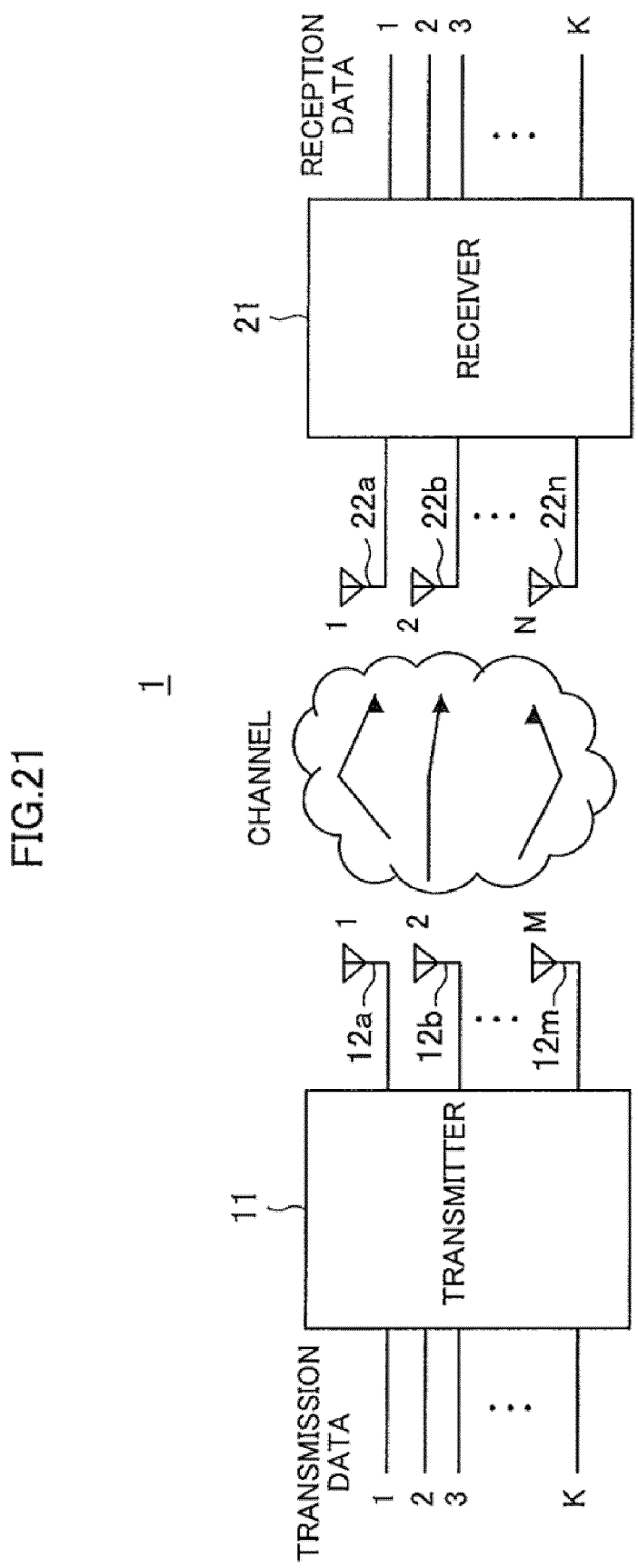
FIG. 21 is a conceptual diagram illustrating a wireless communication system using a MIMO scheme.

FIG. 20A is the same as FIG. 18A, FIG. 20B is a line graph illustrating characteristics when the sub-channel matrix $H_S$ selected by the pattern 1 is used, and FIG. 20C is a line graph illustrating characteristics when the sub-channel matrix $H_S$ selected by the pattern 2 is used. FIG. 20D is a line graph illustrating characteristics when the sub-channel matrix $H_S$ selected by the pattern 3 is used, FIG. 20E is a line graph illustrating characteristics when the sub-channel matrix $H_S$ selected by the pattern 4 is used, and FIG. 20F is a line graph illustrating characteristics when the sub-channel matrix $H_S$ selected by the pattern 5 is used.

As can be seen from the graphs shown in FIGS. 20A to 20F, similar to the line graphs shown in the third embodiment of the present invention, in all the patterns 1 to 5, convergence characteristics are improved, as compared to when S rows are appropriately selected from N rows of the channel matrix H of N rows and M columns to generate the sub-channel matrix $H_S$. The improvement in the convergence characteristics makes it possible to shorten a calculation time.

In this embodiment, (M×N×S) is (3×3×2), but other combinations of M, N, and S may be used. In this case, the convergence characteristics are also improved, as compared to when S rows are appropriately selected from N rows of the channel matrix H of N rows and M columns to generate the sub-channel matrix $H_S$.

As described above, according to the fourth embodiment of the present invention, when the maximum value of the number of data streams to be subjected to a transmission beamforming process is smaller than the number of antennas, the antenna weighting coefficient matrix W is calculated based on the channel matrix H and the sub-channel matrix $H_S$ obtained by extracting the number of rows corresponding to the maximum value of the number of data streams from the channel matrix H.

As such, since the antenna weighting coefficient matrix W is calculated based on the channel matrix H and the sub-channel matrix $H_S$, the rank of the matrix used for calculation is reduced, and it is possible to reduce the amount of calculation of SVD, which is a representative example of the matrix computation, while maintaining characteristics at a certain level. In addition, it is possible to prevent deterioration of characteristics and reduce the overall size of a weighting coefficient matrix calculating circuit. When this wireless communication system is actually mounted to a communication apparatus, the amount of computation depends on the size of a circuit and a computation time. Therefore, it is possible to reduce the size of a circuit and shorten the computation time.

When the sub-channel matrix $H_S$ is generated, it is possible to improve convergence characteristics while minimizing an increase in the amount of computation by giving row selection conditions, similar to the first and second embodiments of the present invention.

In addition, a computer program for estimating a matrix by the above-mentioned method or performing an operation on a matrix may be stored in the transmitter 100 or the receiver 200, and a computing device, such as a CPU (central processing unit) may read the stored computer programs and execute it to implement the method of calculating the antenna weighting coefficient matrix W according to any one of the first to fourth embodiments of the present invention.

The present application contains subject matter related to that disclosed in Japanese Priority Patent Application JP 2008-120597 filed in the Japan Patent Office on May 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus comprising:
    a matrix estimating unit that estimates a channel matrix of N rows and M columns (N and M are natural numbers);
    a selecting unit that selects S rows (S is a natural number, and S<min(M, N)) from the channel matrix estimated by the matrix estimating unit and generates a sub-channel matrix of S rows and M columns; and
    an arithmetic unit that calculates an antenna weighting coefficient matrix based on the sub-channel matrix generated by the selecting unit,
    wherein the selecting unit selects the S rows that make the size of the sub-channel matrix to be the maximum from all matrices having S rows which are selected from the channel matrix.

2. The wireless communication apparatus according to claim 1, wherein the selecting unit selects the S rows that make the sum of the squares of elements of a matrix to be the maximum.

3. The wireless communication apparatus according to claim 1, wherein the selecting unit selects the S rows that make an eigenvalue of a covariance matrix of a matrix or the maximum value of a singular value of the matrix to be the maximum.

4. The wireless communication apparatus according to claim 1, wherein the arithmetic unit includes:
    a coefficient calculating unit that calculates a temporary antenna weighting coefficient matrix based on the sub-channel matrix;
    a first matrix multiplying unit that multiplies the channel matrix by the temporary antenna weighting coefficient matrix to generate a weighted channel matrix;
    a singular value decomposing unit that performs singular value decomposition on the weighted channel matrix; and
    a second matrix multiplying unit that multiplies a right singular matrix obtained by the singular value decomposing unit by the temporary antenna weighting coefficient matrix to generate the antenna weighting coefficient matrix.

5. A wireless communication apparatus comprising:
    a matrix estimating unit that estimates a channel matrix of N rows and M columns (N and M are natural numbers);
    a selecting unit that selects S rows (S is a natural number, and S<min(M, N)) from the channel matrix estimated by the matrix estimating unit and generates a sub-channel matrix of S rows and M columns; and
    an arithmetic unit that calculates an antenna weighting coefficient matrix based on the sub-channel matrix generated by the selecting unit,
    wherein the selecting unit selects the S rows that make the reversibility of the sub-channel matrix to be the highest from all matrices having S rows which are selected from the channel matrix.

6. The wireless communication apparatus according to claim 5, wherein the selecting unit selects the S rows that make an eigenvalue of a covariance matrix of a matrix or the minimum value of a singular value of the matrix to be the maximum.

7. The wireless communication apparatus according to claim 5, wherein the selecting unit selects the S rows that make a determinant of a covariance matrix of a matrix to be the maximum.

8. The wireless communication apparatus according to claim 5, wherein the selecting unit selects the S rows that make a value obtained by dividing a determinant of a covariance matrix of a matrix by the sum of the squares of elements of the matrix to be the maximum.

9. The wireless communication apparatus according to claim 5, wherein the arithmetic unit includes:
a coefficient calculating unit that calculates a temporary antenna weighting coefficient matrix based on the sub-channel matrix;
a first matrix multiplying unit that multiplies the channel matrix by the temporary antenna weighting coefficient matrix to generate a weighted channel matrix;
a singular value decomposing unit that performs singular value decomposition on the weighted channel matrix; and
a second matrix multiplying unit that multiplies a right singular matrix obtained by the singular value decomposing unit by the temporary antenna weighting coefficient matrix to generate the antenna weighting coefficient matrix.

10. A wireless communication apparatus comprising:
a matrix estimating unit that estimates a channel matrix of N rows and M columns (N and M are natural numbers);
a selecting unit that selects S rows (S is a natural number, and S<min(M, N)) from the channel matrix estimated by the matrix estimating unit and generates a sub-channel matrix of S rows and M columns; and
an arithmetic unit that calculates an antenna weighting coefficient matrix based on the channel matrix estimated by the matrix estimating unit and the sub-channel matrix generated by the selecting unit, wherein the arithmetic unit includes:
a coefficient calculating unit that calculates a temporary antenna weighting coefficient matrix based on the sub-channel matrix;
a first matrix multiplying unit that multiplies the channel matrix by the temporary antenna weighting coefficient matrix to generate a weighted channel matrix;
a singular value decomposing unit that performs singular value decomposition on the weighted channel matrix; and
a second matrix multiplying unit that multiplies a right singular matrix obtained by the singular value decomposing unit by the temporary antenna weighting coefficient matrix to generate the antenna weighting coefficient matrix.

11. A wireless communication method comprising the steps of:
estimating a channel matrix of N rows and M columns (N and M are natural numbers);
selecting S rows (S is a natural number, and S<min(M, N)) from the estimated channel matrix and generating a sub-channel matrix of S rows and M columns; and
calculating an antenna weighting coefficient matrix based on the selected sub-channel matrix,
wherein, in the step of selecting the S rows, the S rows that make the size of the sub-channel matrix to be the maximum are selected from all matrices having S rows which are selected from the channel matrix.

12. A wireless communication method comprising the steps of:
estimating a channel matrix of N rows and M columns (N and M are natural numbers);
selecting S rows (S is a natural number, and S<min(M, N)) from the estimated channel matrix and generating a sub-channel matrix of S rows and M columns; and
calculating an antenna weighting coefficient matrix based on the generated sub-channel matrix, wherein, in the step of selecting the S rows, the S rows that make the reversibility of the sub-channel matrix to be the highest are selected from all matrices having S rows which are selected from the channel matrix.

13. A wireless communication method comprising the steps of:
estimating a channel matrix of N rows and M columns (N and M are natural numbers);
selecting S rows (S is a natural number, and S<min(M, N)) from the estimated channel matrix and generating a sub-channel matrix of S rows and M columns; and
calculating an antenna weighting coefficient matrix based on the estimated channel matrix and the generated sub-channel matrix, wherein the calculating step includes the sub-steps of:
calculating a temporary antenna weighting coefficient matrix based on the sub-channel matrix;
multiplying the channel matrix by the temporary antenna weighting coefficient matrix to generate a weighted channel matrix;
performing singular value decomposition on the weighted channel matrix; and
multiplying a right singular matrix obtained by the singular value decomposition by the temporary antenna weighting coefficient matrix to generate the antenna weighting coefficient matrix.

14. A computing device configure to read a computer program and execute the steps of:
estimating a channel matrix of N rows and M columns (N and M are natural numbers);
selecting S rows (S is a natural number, and S<min(M, N)) from the estimated channel matrix and generating a sub-channel matrix of S rows and M columns; and
calculating an antenna weighting coefficient matrix based on the generated sub-channel matrix,
wherein, in the step of selecting the S rows, the S rows that make the size of the sub-channel matrix to be the maximum are selected from all matrices having S rows which are selected from the channel matrix.

15. A computing device configure to read a computer program and execute the steps of:
estimating a channel matrix of N rows and M columns (N and M are natural numbers);
selecting S rows (S is a natural number, and S<min(M, N)) from the estimated channel matrix and generating a sub-channel matrix of S rows and M columns; and
calculating an antenna weighting coefficient matrix based on the generated sub-channel matrix,
wherein, in the step of selecting the S rows, the S rows that make the reversibility of the sub-channel matrix to be the highest are selected from all matrices having S rows which are selected from the channel matrix.

16. A computing device configure to read a computer program and execute the steps of:
estimating a channel matrix of N rows and M columns (N and M are natural numbers);

selecting S rows (S is a natural number, and S<min(M, N)) from the estimated channel matrix and generating a sub-channel matrix of S rows and M columns; and calculating an antenna weighting coefficient matrix based on the estimated channel matrix and the generated sub-channel matrix, wherein the calculating step includes the sub-steps of: calculating a temporary antenna weighting coefficient matrix based on the sub-channel matrix;

multiplying the channel matrix by the temporary antenna weighting coefficient matrix to generate a weighted channel matrix;

performing singular value decomposition on the weighted channel matrix; and multiplying a right singular matrix obtained by the singular value decomposition by the temporary antenna weighting coefficient matrix to generate the antenna weighting coefficient matrix.

17. A wireless communication system comprising:
a first wireless communication apparatus; and
a second wireless communication apparatus,
wherein the first wireless communication apparatus includes a signal transmitting unit that transmits reference signals to the second wireless communication apparatus through a plurality of antennas,
the second wireless communication apparatus includes:
a matrix estimating unit that estimates a channel matrix of N rows and M columns (N and M are natural numbers) based on the reference signals received through a plurality of antennas;
a selecting unit that selects S rows (S is a natural number, and S<min(M, N)) from the channel matrix estimated by the matrix estimating unit and generates a sub-channel matrix of S rows and M columns; and
an arithmetic unit that calculates an antenna weighting coefficient matrix based on the sub-channel matrix generated by the selecting unit, and
the selecting unit selects the S rows that make the size of the sub-channel matrix to be the maximum from all matrices having S rows which are selected from the channel matrix.

18. A wireless communication system comprising:
a first wireless communication apparatus; and
a second wireless communication apparatus,
wherein the first wireless communication apparatus includes a signal transmitting unit that transmits reference signals to the second wireless communication apparatus through a plurality of antennas,
the second wireless communication apparatus includes:
a matrix estimating unit that estimates a channel matrix of N rows and M columns (N and M are natural numbers) based on the reference signals received through a plurality of antennas;
a selecting unit that selects S rows (S is a natural number, and S<min(M, N)) from the channel matrix estimated by the matrix estimating unit and generates a sub-channel matrix of S rows and M columns; and
an arithmetic unit that calculates an antenna weighting coefficient matrix based on the sub-channel matrix generated by the selecting unit, and
the selecting unit selects the S rows that make the reversibility of the sub-channel matrix to be the highest from all matrices having S rows which are selected from the channel matrix.

19. A wireless communication system comprising:
a first wireless communication apparatus; and
a second wireless communication apparatus,
wherein the first wireless communication apparatus includes a signal transmitting unit that transmits reference signals to the second wireless communication apparatus through a plurality of antennas,
the second wireless communication apparatus includes:
a matrix estimating unit that estimates a channel matrix of N rows and M columns (N and M are natural numbers) based on the reference signals received through a plurality of antennas;
a selecting unit that selects S rows (S is a natural number, and S<min(M, N)) from the channel matrix estimated by the matrix estimating unit and generates a sub-channel matrix of S rows and M columns; and
an arithmetic unit that calculates an antenna weighting coefficient matrix based on the channel matrix estimated by the matrix estimating unit and the sub-channel matrix generated by the selecting unit, and
the arithmetic unit includes:
a coefficient calculating unit that calculates a temporary antenna weighting coefficient matrix based on the sub-channel matrix;
a first matrix multiplying unit that multiplies the channel matrix by the temporary antenna weighting coefficient matrix to generate a weighted channel matrix;
a singular value decomposing unit that performs singular value decomposition on the weighted channel matrix; and
a second matrix multiplying unit that multiplies a right singular matrix obtained by the singular value decomposing unit by the temporary antenna weighting coefficient matrix to generate the antenna weighting coefficient matrix.

* * * * *